(12) United States Patent
Matusek et al.

(10) Patent No.: US 10,995,711 B1
(45) Date of Patent: May 4, 2021

(54) APPARATUS AND METHOD FOR MODIFYING A FUEL TANK TO ACCEPT AN IN-TANK FUEL PUMP

(71) Applicant: Aeromotive, Inc., Lenexa, KS (US)

(72) Inventors: Steven M. Matusek, Olathe, KS (US); Shawn D. Wessol, Parkville, MO (US); Dale A. White, Shawnee, KS (US); Karl M. Brewer, Baldwin, KS (US)

(73) Assignee: Aeromotive, Inc., Lenexa, KS (US)

( * ) Notice: Subject to any disclaimer, the term of this patent is extended or adjusted under 35 U.S.C. 154(b) by 0 days.

(21) Appl. No.: 16/379,345

(22) Filed: Apr. 9, 2019

Related U.S. Application Data

(60) Provisional application No. 62/749,999, filed on Oct. 24, 2018, provisional application No. 62/654,996, filed on Apr. 9, 2018.

(51) Int. Cl.
*F02M 41/00* (2006.01)
*F02M 37/00* (2006.01)
(Continued)

(52) U.S. Cl.
CPC ......... *F02M 37/0076* (2013.01); *B60K 15/03* (2013.01); *F02M 37/0017* (2013.01);
(Continued)

(58) Field of Classification Search
CPC ...... F02M 41/063; F02M 41/00; F02M 37/10; F02M 37/106; B60K 2015/03105; B60K 2015/03144; F17C 2201/0171
(Continued)

(56) References Cited

U.S. PATENT DOCUMENTS 4,606,319 A 8/1986 Silva
4,961,693 A 10/1990 Hoover et al.
(Continued)

FOREIGN PATENT DOCUMENTS

| DE | 3941892 C3 | 6/1990 |
| EP | 1378670 A2 | 1/2004 |
| WO | 2018009849 A1 | 1/2018 |

OTHER PUBLICATIONS

Photographs of replacement fuel sending units with attached fuel pump for a 1986 Ford Mustang of a type on sale at least as early as Dec. 31, 1986. Photographs published at https://www.rockauto.com/en/catalog/ford,1986,mustang,5.0I+302cid+v8,1133840,fuel+&+air,fuel+pump+&+housing+assembly,10147.

*Primary Examiner* — John Kwon
(74) *Attorney, Agent, or Firm* — Erickson Kernell IP, LLC; Kent R. Erickson

(57) ABSTRACT

A method and apparatus for modifying an existing style fuel tank to add a fuel pump and a baffle assembly in the tank comprises removing an existing fuel sending unit from a sending unit opening and cutting an access hole in the top of the tank. Fuel supply and return lines, and electrical connections for the fuel pump are routed through a replacement cap for covering the sending unit opening and not up through the hole created for insertion of the pump and baffle assembly. The baffle assembly includes a cup for holding fuel around and over the fuel pickup connected to the fuel pump. The cup may be formed from a compressible material to allow it to be compressed before insertion into the tank through the access opening or it may be assembled inside of the tank from segments inserted through the access opening.

16 Claims, 20 Drawing Sheets

(51) Int. Cl.
*F02M 37/10* (2006.01)
*B60K 15/03* (2006.01)

(52) U.S. Cl.
CPC ........ *F02M 37/0052* (2013.01); *F02M 37/10* (2013.01); *B60K 2015/0344* (2013.01); *B60K 2015/0348* (2013.01); *B60K 2015/03217* (2013.01); *B60K 2015/03243* (2013.01)

(58) Field of Classification Search
USPC ............... 123/445, 446, 448, 469, 470, 478; 137/565.17, 565.34, 565.37, 509, 549, 137/571, 572, 576
See application file for complete search history.

(56) References Cited

U.S. PATENT DOCUMENTS

| | | | | |
|---|---|---|---|---|
| 5,642,718 | A | * | 7/1997 | Nakai .................... F02M 37/10 123/497 |
| 5,979,485 | A | | 11/1999 | Tuckey et al. |
| 6,062,203 | A | * | 5/2000 | Takahashi ............ F02M 37/103 123/509 |
| 8,783,287 | B2 | * | 7/2014 | Matusek ................ B60K 15/03 137/565.34 |
| 9,567,954 | B2 | | 2/2017 | Matusek et al. |
| 2006/0154538 | A1 | * | 7/2006 | McCarthy ............ F02M 37/007 440/88 F |
| 2011/0084076 | A1 | | 8/2011 | Whelan et al. |
| 2013/0160877 | A1 | | 6/2013 | Walter et al. |

* cited by examiner

APPARATUS AND METHOD FOR MODIFYING A FUEL TANK TO ACCEPT AN IN-TANK FUEL PUMP

CROSS-REFERENCE TO RELATED APPLICATIONS

This application claims the benefit of provisional patent application Ser. No. 62/654,996, filed Apr. 9, 2018 and provisional patent application Ser. No. 62/749,999, filed Oct. 24, 2018, the disclosures of which are hereby incorporated herein in their entireties by reference.

BACKGROUND OF THE INVENTION

Field of the Invention

This invention relates to automotive fuel systems, and in particular to an apparatus and method for modifying a fuel tank to accept an in-tank fuel pump when the tank was not originally designed for use with such an in-tank pump or when an additional in-tank pump is required.

Description of the Related Art

Modern automobiles using electronic fuel injection systems utilize a fuel pump mounted inside the fuel tank of the vehicle (hereinafter referred to as an "in-tank pump") to pick up fuel from the tank and deliver it to the engine. Older automobiles, which typically used carburetors to mix fuel with incoming air, did not use in-tank pumps, but instead relied on mechanical or electric pumps mounted outside of the fuel tank. A fuel sending unit mounted within an opening in the tank is used to supply fuel to the externally mounted fuel pump. The fuel sending unit typically includes a metal cap or fitting secured by a locking ring within a hole in the tank for the sending unit. A rigid fuel supply line extends through the cap with a fuel filter mounted on and surrounding the open, inner end of the rigid fuel supply line extending into the tank. A float type, fuel level sensor is mounted on the rigid fuel supply line within the tank and electrically connected to a terminal extending through the cap.

Recently, it has become increasingly popular among automobile enthusiasts to modify an older car, such as a muscle car from the 1960s or 1970s, by installing a modern fuel injected engine in place of the original power plant, or by replacing the original carburetor with an aftermarket fuel injection system. This type of modification can produce a vehicle with increased performance, improved fuel efficiency and better emissions while retaining the look and feel of the classic muscle car. One problem frequently encountered during the course of making such a modification is the difficulty of mounting an in-tank fuel pump in a fuel tank not originally designed to accept an in-tank pump.

In other applications, it may be advantageous to add an in-tank pump to a fuel system in order to supplement a pre-existing fuel pump. The additional pump may be mounted in parallel to the pre-existing pump and used on-demand to provide additional fuel volume as needed by the engine. The pre-existing fuel pump may be either an external pump or an in-tank pump, such as an original equipment in-tank pump. If the pre-existing fuel pump is an original equipment in-tank pump, it then becomes necessary to modify a fuel tank which was originally designed for use with a single in-tank pump in order for it to accept a second in-tank pump.

In either of the above applications, the problem of mounting an in-tank pump in an existing tank is further complicated by an additional requirement that baffling be added to the tank along with the pump. In-tank fuel pumps need to be surrounded by baffles that prevent all of the fuel from flowing or sloshing away from the pump during turns or other abrupt maneuvers. These baffles act to retain a column of fuel over the pump's fuel pickup so that the pump never draws air into the fuel injection system, which can lead to fuel starvation and/or vapor lock. Carburetors, because they have reserve fuel in their fuel bowls, are more tolerant of momentary fuel deprivation and do not require similar baffles around the fuel pickups.

U.S. Pat. No. 9,567,954 of Matusek at al. and assigned to Aeromotive, Inc. discloses an apparatus and method for modifying a fuel tank to accept an in-tank fuel pump using a compressible baffle including a compressible cup for holding fuel around and over the pump's fuel pickup. In order to add the in-tank pump and baffle to an existing fuel tank, a hole must first be cut into the top of the tank through which the pump and baffle can be inserted. It is advantageous that the hole not be any larger than necessary, and therefore, the baffle disclosed is made of a compressible foam core having a lower end inserted into an elastomeric cup with relative small holes at a lower end which allow fuel to flow into the cup but which slow the flow of fuel out of the cup in turns or other maneuvers which create transient periods in which fuel may flow or slosh away from the baffle and fuel pickup for the fuel pump. The foam core and elastomeric cup are radially compressible to fit through the smallest diameter hole possible (a hole not much larger than the diameter of the pump) and the compressibility of the foam makes the assembly height-adjustable to correspond to the depth of virtually any tank. The hole cut in the tank to receive the pump and baffle is then covered with a cap secured to the top of the tank over the hole and which includes an outlet port for connecting to the cars fuel injection system or carburetor, a return port for returning excess fuel back to the tank and a vent port along with a pair of terminals for connecting with the vehicle's electrical system to power the pump. Aeromotive, Inc. markets its apparatus for modifying a fuel tank as the Phantom™ in-tank fuel pump system.

The Phantom™ system has proven particularly popular in the relevant market. One limitation of the Phantom™ system is that the cap with the structure forming the ports extends above the tank approximately one and a half inches. In some applications, there is insufficient clearance between the top of the tank and the floor of the car to re-mount the modified tank without replacing the hangers with longer hangers which adds time and expense to the installation. It may also be undesirable to have to drop the tank lower than a normal installation. In addition, routing of the supply and return lines from the cap to the fuel injection system or carburetor can prove difficult and time consuming.

What is needed is an apparatus and method for mounting an in-tank pump in a fuel tank, using a compressible baffle or the like without significantly increasing the effective height of the tank and its fittings. There is also a need for such a modified tank which is easier to install.

SUMMARY OF THE INVENTION

The present invention involves a method and apparatus for modifying an existing style fuel tank to add a fuel pump and a baffle assembly through an access hole created in the top of the tank wherein the fuel supply and return lines, and electrical connection for the fuel pump, are routed through a replacement cap for the hole for the original fuel sending unit and not up through the hole created for insertion of the pump and baffle assembly. The baffle assembly includes a cup for holding fuel around and over the fuel pickup connected to the fuel pump. The cup may be formed from a compressible material to allow it to be compressed before insertion into the tank through the access opening or it may be assembled inside of the tank from segments inserted through the access opening. Check valves may be mounted in flow control openings formed in a sidewall of the cup to allow fuel to flow into but not out of the cup through the sidewall. It is also foreseen that a venturi type, fuel siphoning system could be connected to the fuel supply or return line mounted within the baffle assembly. The fuel siphoning system may incorporate a trap in an outlet passageway, such as an S-type trap, to maintain a hydraulic seal in the outlet passageway of the siphoning system to increase the speed at which the suction is generated for siphoning fuel from a remote portion of the tank through the siphoning system.

DETAILED DESCRIPTION OF THE PREFERRED EMBODIMENTS

Figure 1:
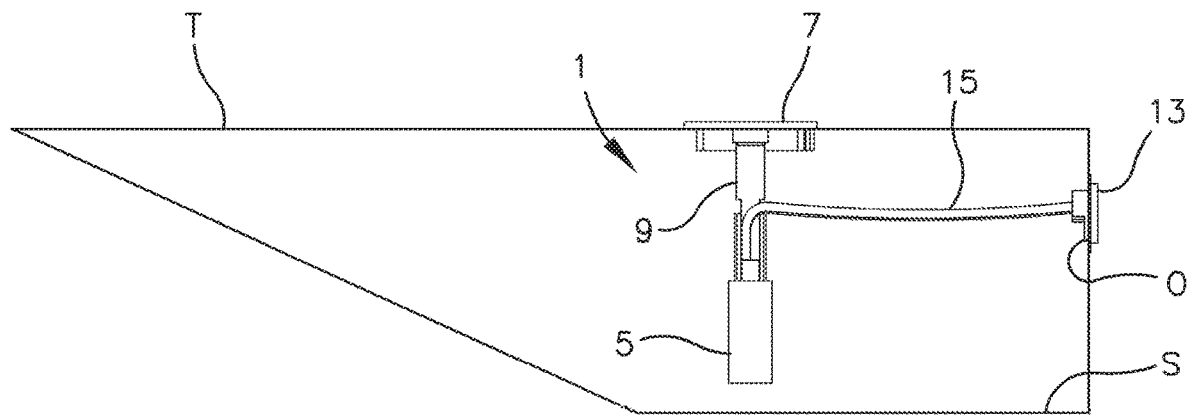
FIG. 1 is a cross-sectional view of a modified fuel tank having a fuel pump suspended on a hanger from a top plate mounted over a hole created to insert the fuel pump and a compressible baffle assembly (not shown in FIG. 1) and in which the fuel supply line and return line and electrical connections for the pump are routed through a replacement cap for an existing hole in the tank for the original fuel sending unit.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. The drawings constitute a part of this specification and include exemplary embodiments of the present invention and illustrate various objects and features thereof.

Certain terminology will be used in the following description for convenience in reference only and will not be limiting. For example, the words "upwardly," "downwardly," "rightwardly," and "leftwardly" will refer to directions in the drawings to which reference is made. The words "inwardly" and "outwardly" will refer to directions toward and away from, respectively, the geometric center of the embodiment being described and designated parts thereof. Said terminology will include the words specifically mentioned, derivatives thereof and words of a similar import.

Referring to the drawings in more detail, the reference number 1 generally designates an apparatus for modifying a fuel tank T according to the present invention. The fuel tank modification apparatus 1 is particularly well adapted for modifying a tank T that is a standard fuel tank manufactured primarily for aftermarket purchasers looking to replace an existing fuel tank with a correspondingly sized and shaped fuel tank that includes an in-tank fuel pump. It is foreseen that the fuel tank modification apparatus 1 may also be used to modify a pre-existing style fuel tank T prior to installation as the original fuel tank for the car. The fuel tank T includes an opening O which is sized to receive a cap or fitting for an original style fuel sending unit (not shown). In the embodiment shown, the opening O is formed in a side of the tank T, proximate a sump S.

The fuel tank modification apparatus 1 includes a fuel pump 5, which is suspended from a cover plate 7 by a pump mounting assembly 9, a baffle assembly 11, a replacement cap or plug 13 for covering opening O, supply line 15, return line 16, power wire 18 and ground wire 19. The construction of the baffle assembly 11 may be similar to the baffle disclosed in U.S. Pat. No. 9,567,954. The mounting of the pump 5 on pump mounting assembly 9 may also be similar to the mounting of the pump and pump mounting assembly as in U.S. Pat. No. 9,567,954, the contents of which are incorporated herein by reference.

In the embodiment shown, the baffle assembly 11 includes a compressible foam core 21 and a compressible cup 23 formed of an elastomeric material. Openings 25 are formed in a sidewall 27 of the cup 23 near a lower end thereof. The openings 25 allow fuel to flow into the cup but slow the flow of fuel out of the cup 23 during turns and other movement of the vehicle.

Figure 3:
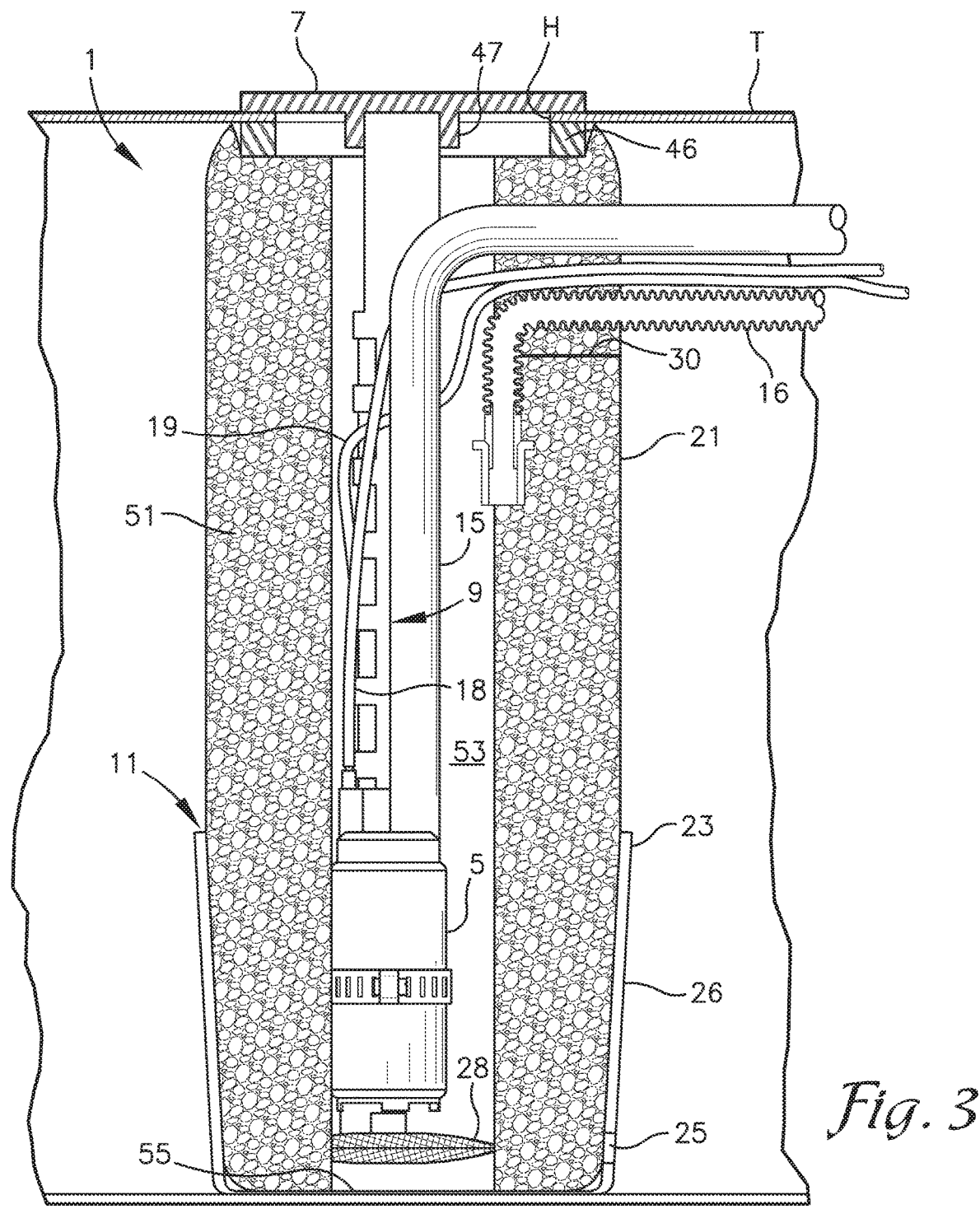
FIG. 3 is a further enlarged and fragmentary, cross-sectional view of the tank as in FIG. 1 with the baffle assembly included.
Figure 5:
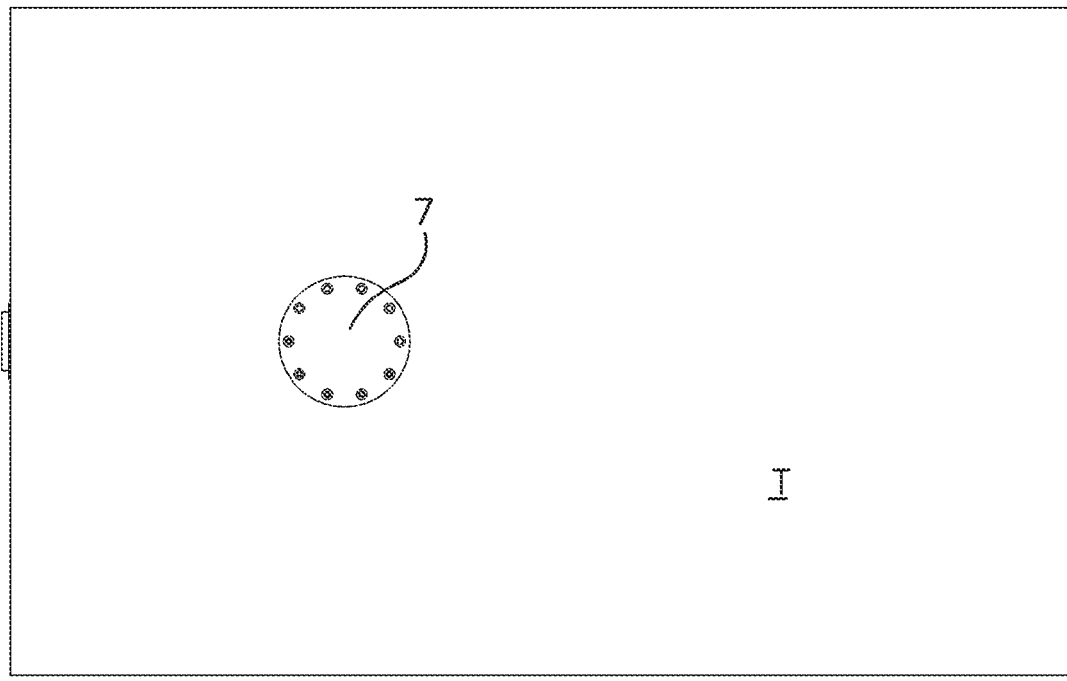
FIG. 5 is a top view of the modified tank showing a top plate covering a hole added for insertion of the fuel pump and baffle assembly.
Figure 4:
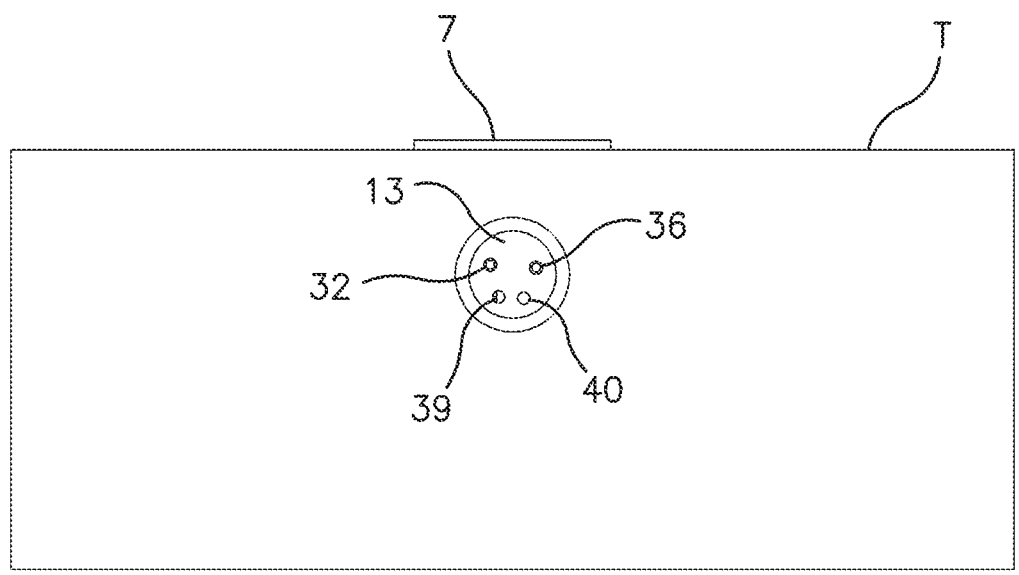
FIG. 4 is an end view of the tank showing a replacement cap covering the hole for the original fuel sending unit.
Figure 6:
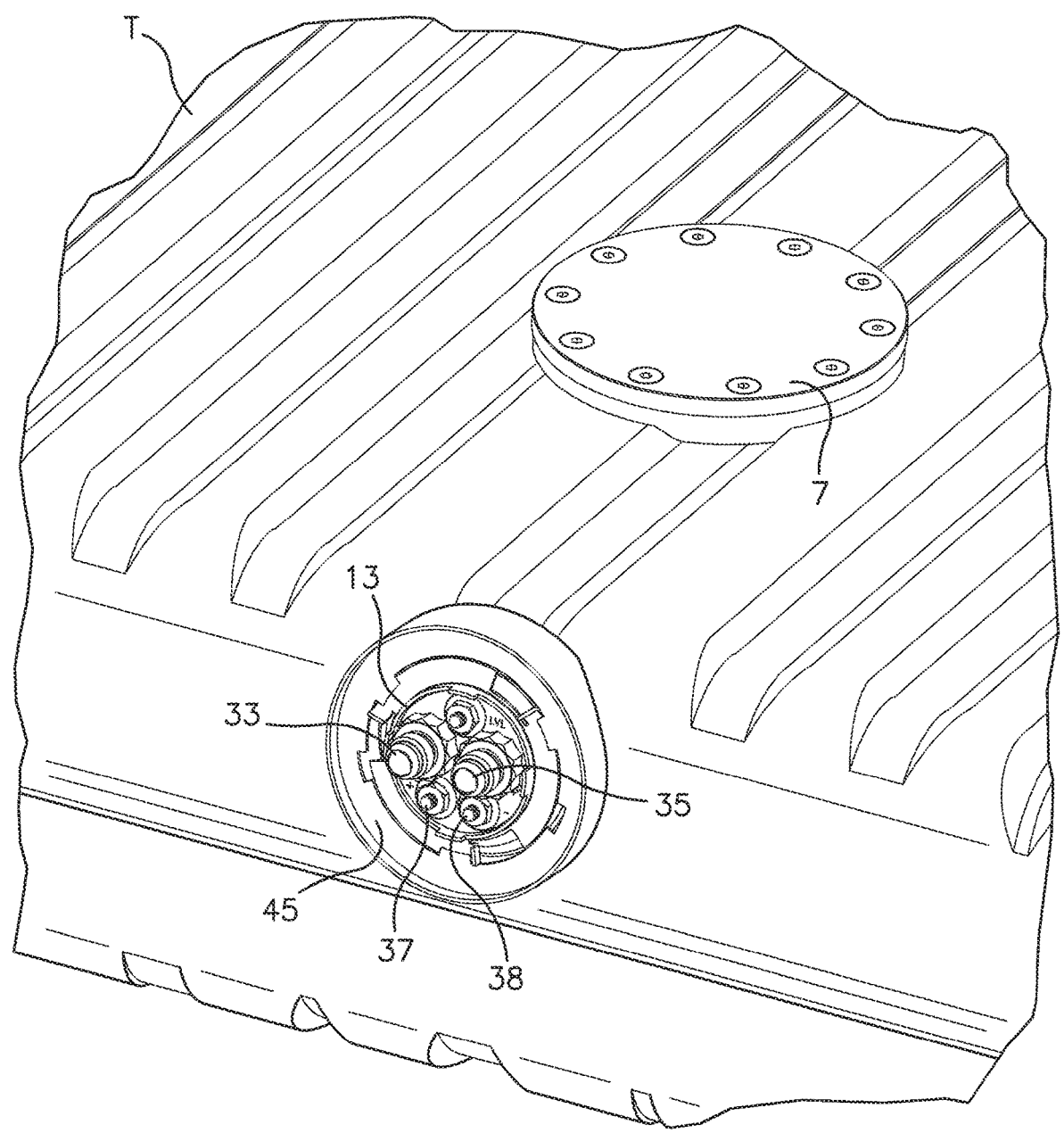
FIG. 6 is a perspective view showing the top of the tank with the top plate and an end of the tank showing the replacement cap covering the hole for the original sending unit.
Figure 7:
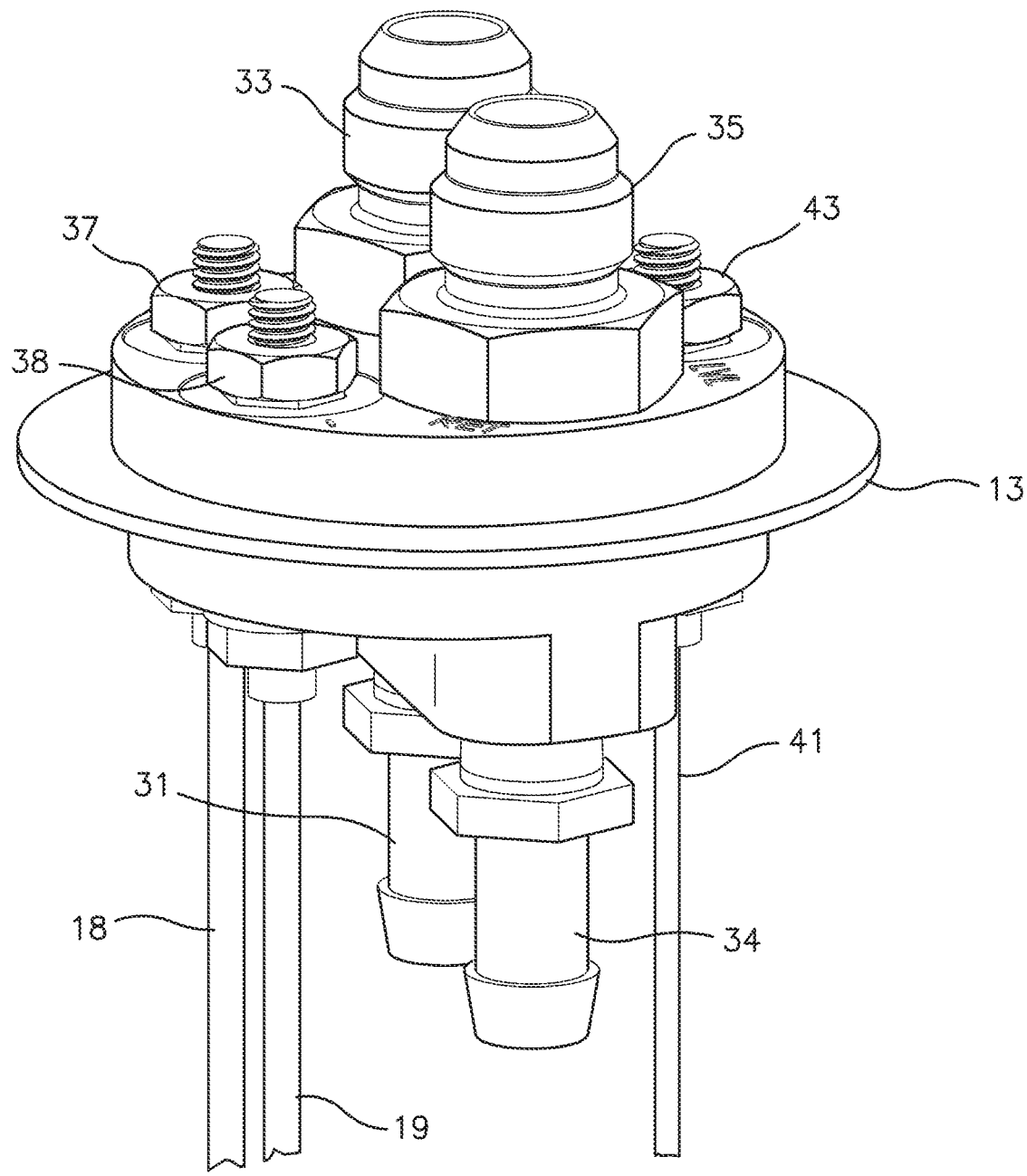
FIG. 7 is a perspective view of an end of the replacement cap to be inserted within the tank.
Figure 8:
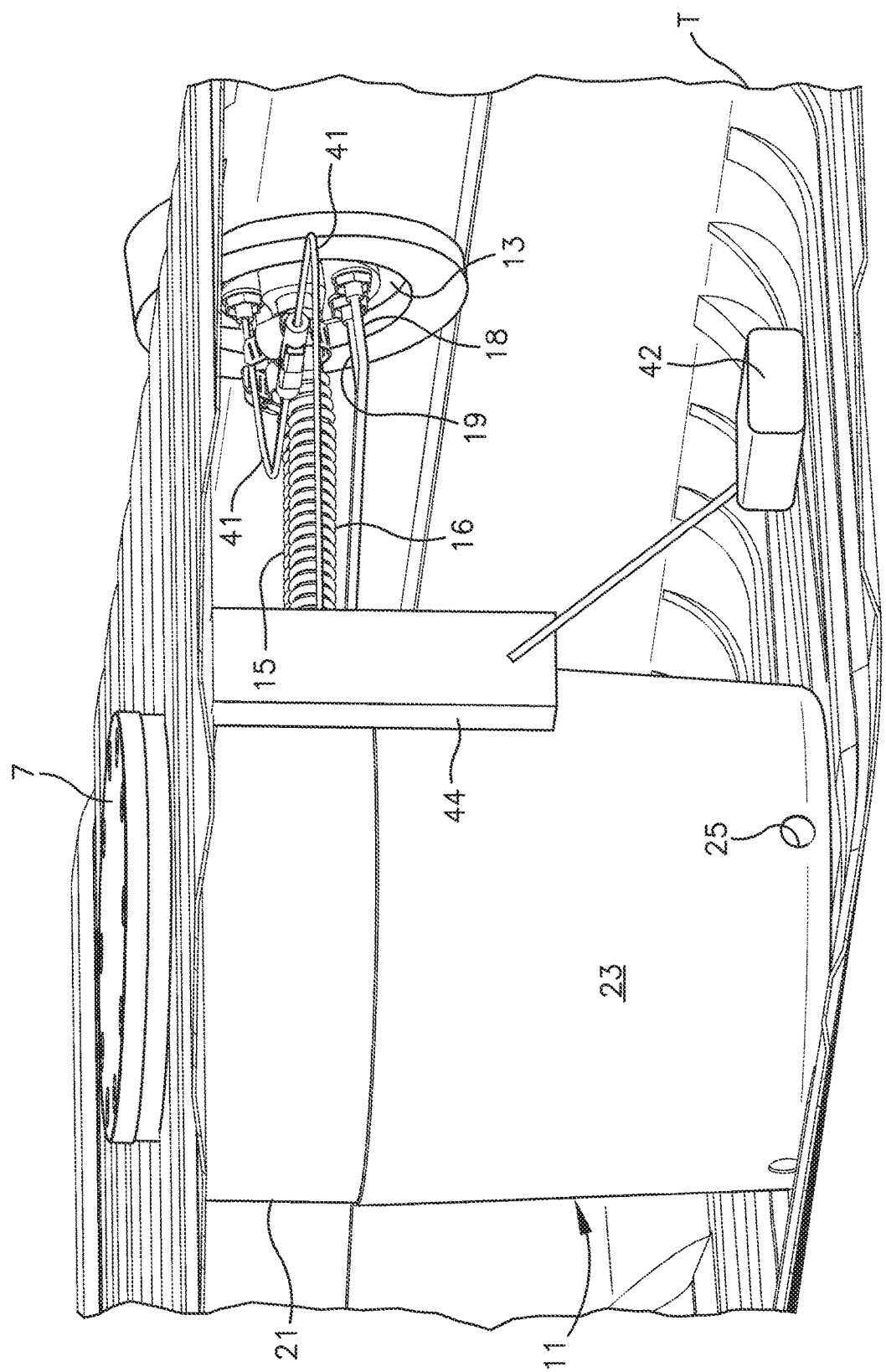
FIG. 8 is a perspective view of the inside of the tank showing the replacement cap and a fuel level sensor mounted inside the tank.

Referring to FIG. 3, a fuel pickup 28 is shown connected to and extending below the fuel pump 5. The supply line 15 extends from an outlet from the fuel pump 5, at an upper end thereof, through a slot or opening 30 formed in a side of the foam core 21 and to the replacement cap 13 for the opening O to tank T. With reference to FIGS. 4-8, the in-tank supply line 15 is connected to an in-tank supply line fitting 31 mounted in a supply line bore or port formed in the replacement cap 13. An external supply line fitting 33 is mounted to replacement cap 13 in supply line bore and provides means for flow connecting the in-tank supply line 15 to an external supply line (not shown) outside of the tank T which is then connected to the fuel injection system or carburetor. The in-tank return line 16 is also connected to an external return line (not shown) outside of the tank T through in-tank return line fitting 34 and an external return line fitting 35 connected to the replacement cap 13 in a return line bore or port 36 extending through the replacement cap 13. The in-tank supply line and return line fittings may be ⅛ inch NPT by 5/16 inch brass hose barbs. The external supply line and return line fittings may be −6 ORB to −6 AN fittings. At least two terminals 37 and 38 are also mounted on and extend through terminal bores formed in the replacement cap 13. The terminals 37 and 38 may be conventional terminal pins. In the embodiment shown, power wire 18 for supplying power to pump 5 is connected to the first terminal 37 and ground wire 19 is connected to the second terminal 38. A power wire 41 for an in-tank fuel level sensor 42 may be connected to a third terminal 43 connected to and extending through a terminal bore formed in the replacement cap 13. In the embodiment shown in FIG. 8, the fuel level sensor 42 is shown supported on a bracket or mounting arm 44 connected to and suspended from the cover plate 7. It is foreseen that the mounting arm 44 could be connected to the sheet metal forming the tank T or to the replacement cap 13. A locking ring 45 is used to secure the replacement cap 13 to the tank T across opening O. One advantage of routing the supply line 15 and return line 16 through the original fuel sending unit opening O, in the tank T, is that the original path for the fuel supply and return lines exterior to the tank can be used which facilitates installation.

The cover plate 7 is preferably formed as a relatively thin disc sized large enough in diameter to cover a hole H formed in the top of the tank T through which the pump 5, and compressed baffle assembly 11 may be inserted for installation in the tank T. The cover plate 7 may be secured to the top of the tank T using sheet metal screws or the like (not shown) or by bolting to an adapter ring 46 mounted inside and against an upper surface of the tank T. When installed, the portion of the cover plate 7 extending above the top of the tank T is preferably no thicker than approximately ¼$^{th}$ of an inch. A mounting boss 47 may be formed on the bottom of the cover plate 7 and to which the pump hanger bracket 9 may be secured. By forming the cover plate 7 as a relatively thin disc, the modified tank T can be installed in cars with more limited clearance between the tank and other parts of the vehicle body without having to replace the existing tank mounting brackets or straps with longer mounting brackets or straps and without having to lower the tank T relative to the vehicle body.

The foam core 21 is generally in the shape of a hollow cylinder having a sidewall surrounding an interior space sized to receive the fuel pump 5. The core 21 is porous enough to let fuel pass easily therethrough from the fuel tank T to the interior space 53, whereas the cup 23 is generally impermeable to fuel, except through openings 25 in the cup sidewall 26 as discussed previously.

The core 21 is compressible both longitudinally to match the depth of the tank T and radially to fit through the access hole H in the top wall of the tank T. The core 21 is also preferably resilient enough to re-expand once it is inserted into the tank T and to thereby produces an expansive force which urges the top and bottom ends of the baffle assembly 11 against the top and bottom walls of the tank T, respectively. A preferred material for the core 21 is reticulated polyurethane foam meeting military specification MIL-DTL-83054C for aircraft fuel tank baffle and inerting material. It is to be understood, however that any compressible, and permeable foam material which is acceptably resistant to the respective fuel could be used. It is also foreseen that the foam core could be replaced by alternative expandable structure such as spring biased telescoping rods or legs expandable to extend between the top and bottom of the tank T.

The cup 23, in the embodiment shown, is preferably molded of a fuel resistant elastomer such as nitrile, epichlorohydrin, or the like and is at least somewhat compressible in diameter. It is foreseen, however that the cup 23 could be formed from a sheet material rather than being molded and that other materials, such as mylar, polytetrafluoroethylene, or the like could be used. It is also foreseen that the cup 23 could be formed by applying a sealant (such as AC-236 aerospace sealant, manufactured by 3M), directly to the core 21. The cup 23 includes a closed bottom 55. The cup sidewall 26 has a height selected to only extend part way up the sidewall 51 of the core 21, but high enough to retain a column of fuel over a fuel pickup 28 of the pump 5. Fuel flows over an upper margin of the sidewall 26 of the cup 23, through the core 21 and into the interior space 53 when the fuel level in the tank T is sufficiently high.

Figure 9:
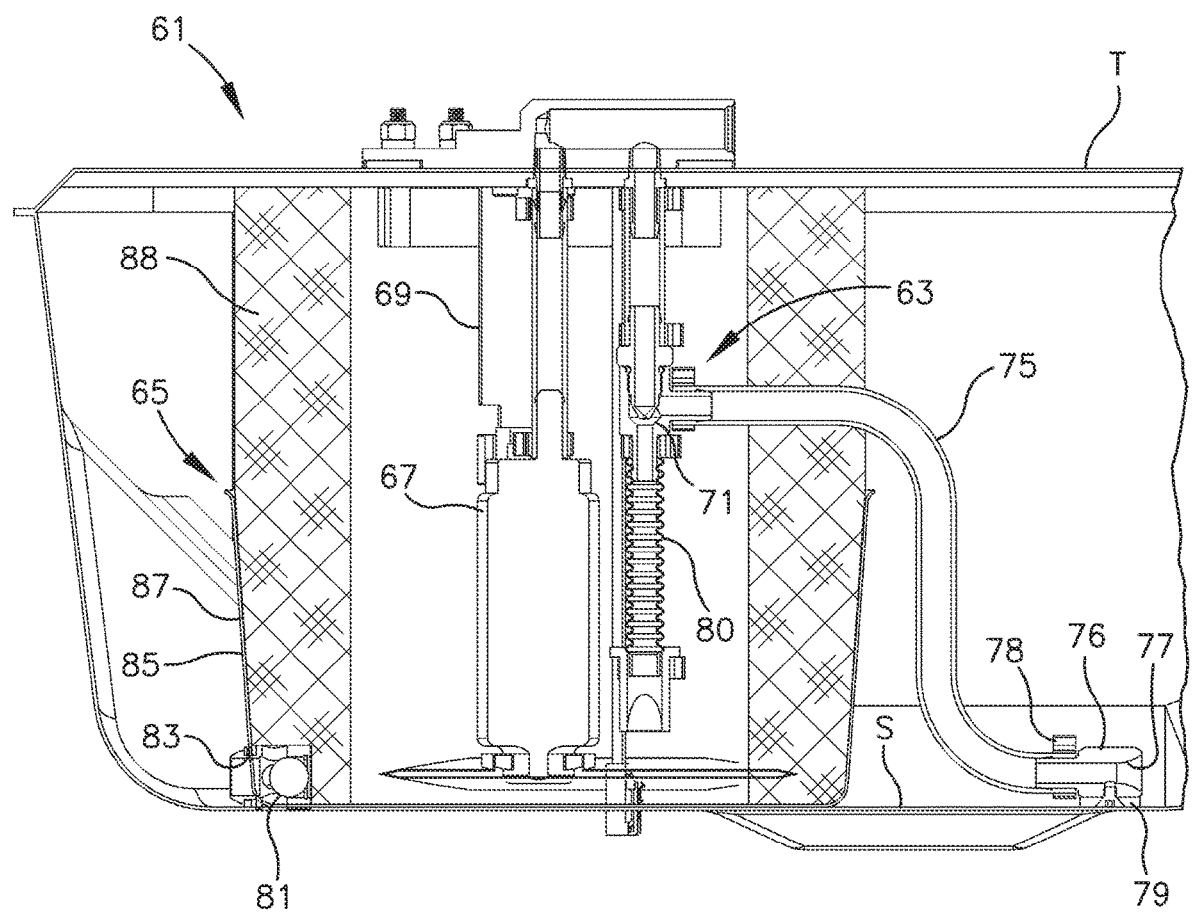
FIG. 9 is a schematic, cross-sectional view of a fuel tank modification system incorporating a fuel siphoning system and check valves incorporated into the baffle assembly including a resilient cup supported by a compressible foam core.
Figure 10:
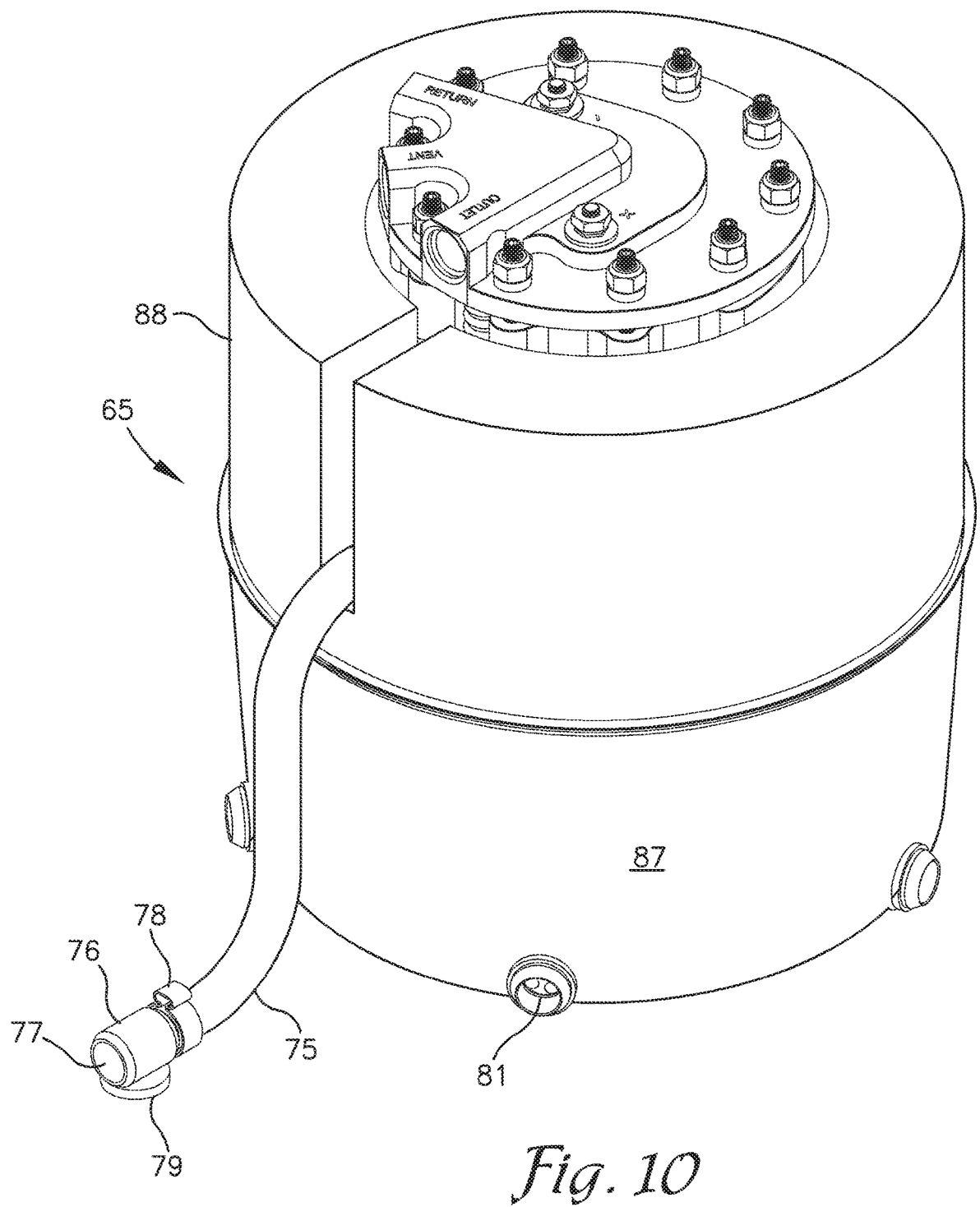
FIG. 10 is a perspective view of the fuel tank modification system as shown in FIG. 9.

It is foreseen that one-way check valves, of the type shown in the embodiment in FIGS. 9 and 10, may be mounted in the openings 25 in the cup sidewall 26. The check valves are adapted to allow fuel to flow into the cup 23 through the sidewall 26 but not back out the check valve. The check valves may be advantageously constructed such that they can be inserted and supported by the cup 23 to allow use of the collapsible material. However, it is foreseen that the cup could be formed from multiple segments of a more rigid material such as selected plastics or metal which would permit lateral compression of the cup for insertion in tank hole H, and then expansion of the cup to hold a desirable quantity of fuel. Expansion of the more rigid material forming the cup could be achieved using springs or the like incorporated into the cup which would allow replacement of the foam core 21 with other mechanical means for positioning the cup at the bottom of the tank T in the sump S. It is also foreseen that the cup could be connected to the bottom of the tank T adhesively during installation to remove the need for mechanical expansion means or an expandable foam core.

In use, a location on the tank T is selected and the access hole H is cut into the top of the fuel tank T using a hole saw or the like. The access hole H must be large enough for the fuel pump 5 to be inserted therethrough. The depth of the tank T is measured and the pump hanger bracket 9 is cut to a length which is somewhat shorter than the depth of the tank T. It is also foreseen that the hanger bracket 9 could be made to telescope or otherwise adjust to tanks T of varying depths. The fuel pump 5 is installed on the hanger bracket 9 (for example by using worm gear clamps). The core 21 of the baffle assembly 11 is also cut to length prior to insertion; in this case, to a length somewhat longer than the depth of the tank T so that the baffle assembly 11 is sized to be compressed between the top and bottom of the tank T.

After the baffle assembly 11 is installed, the pump 5 attached to the cover plate 7 by hanger bracket 9 is installed in the interior space 53 of the foam core 21 and the top plate is then secured to the top panel or wall of the tank T over hole H. A gasket, not shown, may be secured between the cover plate 7 and the top wall of the tank T. The supply line 15 and return line 16 are connected to the supply line and return line fittings 31 and 34 on replacement cap 13 and power and ground wires 18 and 19 are connected to terminals 37 and 38 on the replacement cap 13. The external supply line and return line are then connected to the external supply line fitting 33 and external return line fitting 35 respectively.

Figure 2:
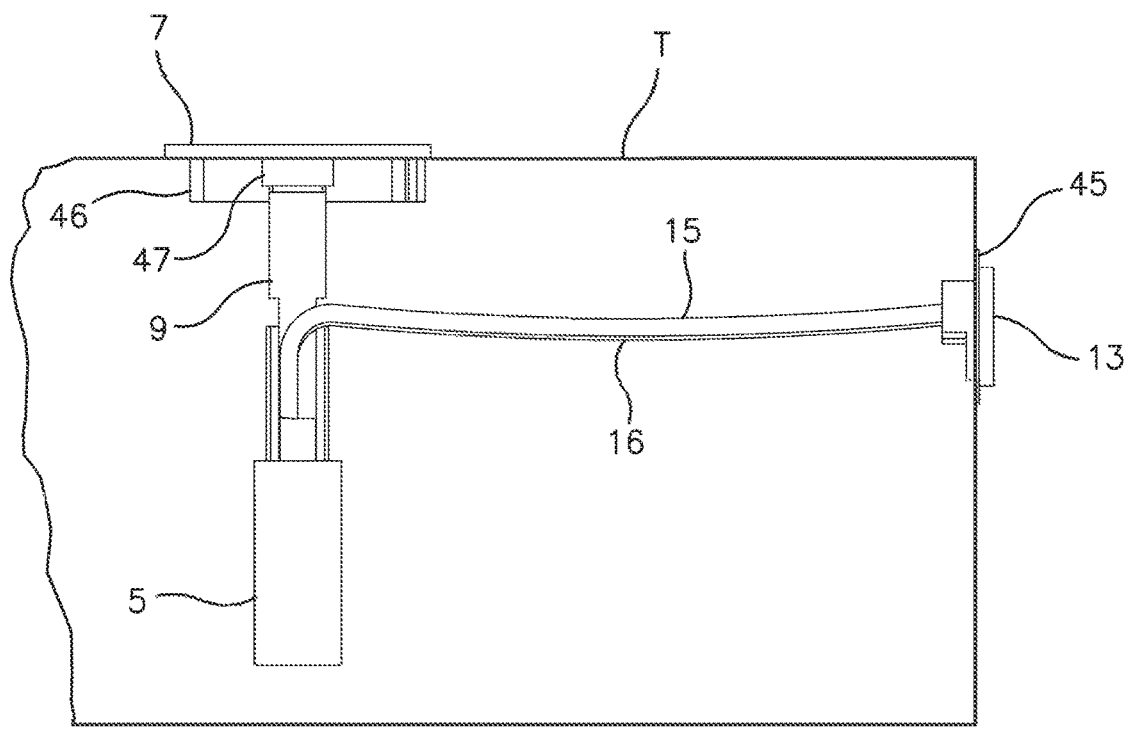
FIG. 2 is an enlarged and fragmentary, cross-sectional view of the tank as shown in FIG. 1.

Referring to FIGS. 9 and 10, an alternative fuel tank modification system 61 is shown incorporating a fuel siphoning system 63 for siphoning fuel from a point in the fuel tank remote from a baffle assembly 65 surrounding an internally mounted fuel pump 67. The baffle assembly 65 and a fuel pump mounting assembly 69 are similar to the baffle assembly and fuel pump mounting assembly shown in FIGS. 1 and 2 of U.S. Pat. No. 9,567,954 of Matusek et al. which is incorporated herein by reference. The fuel siphoning system 63 includes a venturi type siphoning adapter 71 mounted in-line with a pressurized siphon supply line 73 extending into the hollow interior of the baffle assembly 65. The pressurized siphon supply line 73 is formed as a branch off of the fuel supply line 74 connected to the outlet of the pump 67. A fuel siphon tube 75 is connected at a first end to the siphoning adapter 71 near a restriction in the siphoning adapter 71 and a second, open end of the siphon tube 75 is connected to the bottom of the tank T remote from the baffle assembly 65. The reduction in pressure of fuel flowing through the restriction and then expansion of the siphoning adapter draws fuel from the tank through the open end of the siphoning tube 75 and into a siphon discharge line 80 having an outlet opening preferably positioned in the baffle proximate the intake to the fuel pump.

A siphon pickup fitting 76 is connected to the distal end of the fuel siphon line 75 remote from the siphoning adapter 71. The fitting 76 shown is formed form a relatively rigid material such as metal or plastic with a through bore 77 and is connected to the fuel siphon line 75 by a hose clamp 78. A magnet 79 is mounted on the bottom of the siphon pickup fitting 76 for use in fixing the position of the siphon pickup fitting 76 at a desired location within a fuel tank formed of a magnetic material. If the tank is formed from plastic or stainless steel or any other non-magnetic material, then a block of magnetic material or additional magnet (not shown) may be used and positioned on the outside of the tank to couple with the magnet 79 through the tank wall. In the embodiment shown, the magnet 79 is connected to the siphon pickup fitting 76 by a screw. It is foreseen that other fasteners or other means for connecting the magnet 79 to the fitting 76 could be used.

Figure 11:
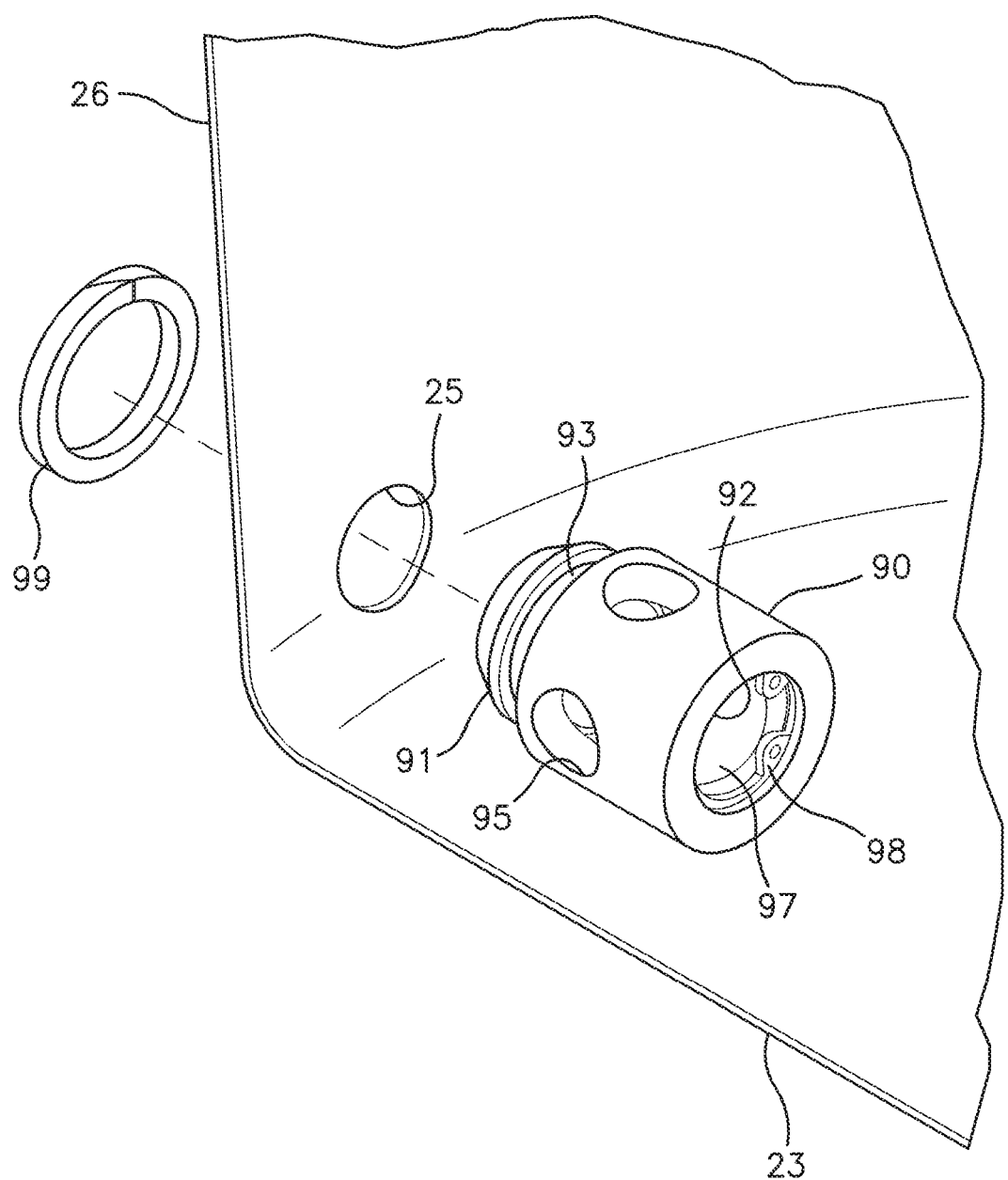
FIG. 11 is an enlarged and fragmentary, exploded perspective view of one of the check valves connected to the resilient cup with the foam core removed.
Figure 12:
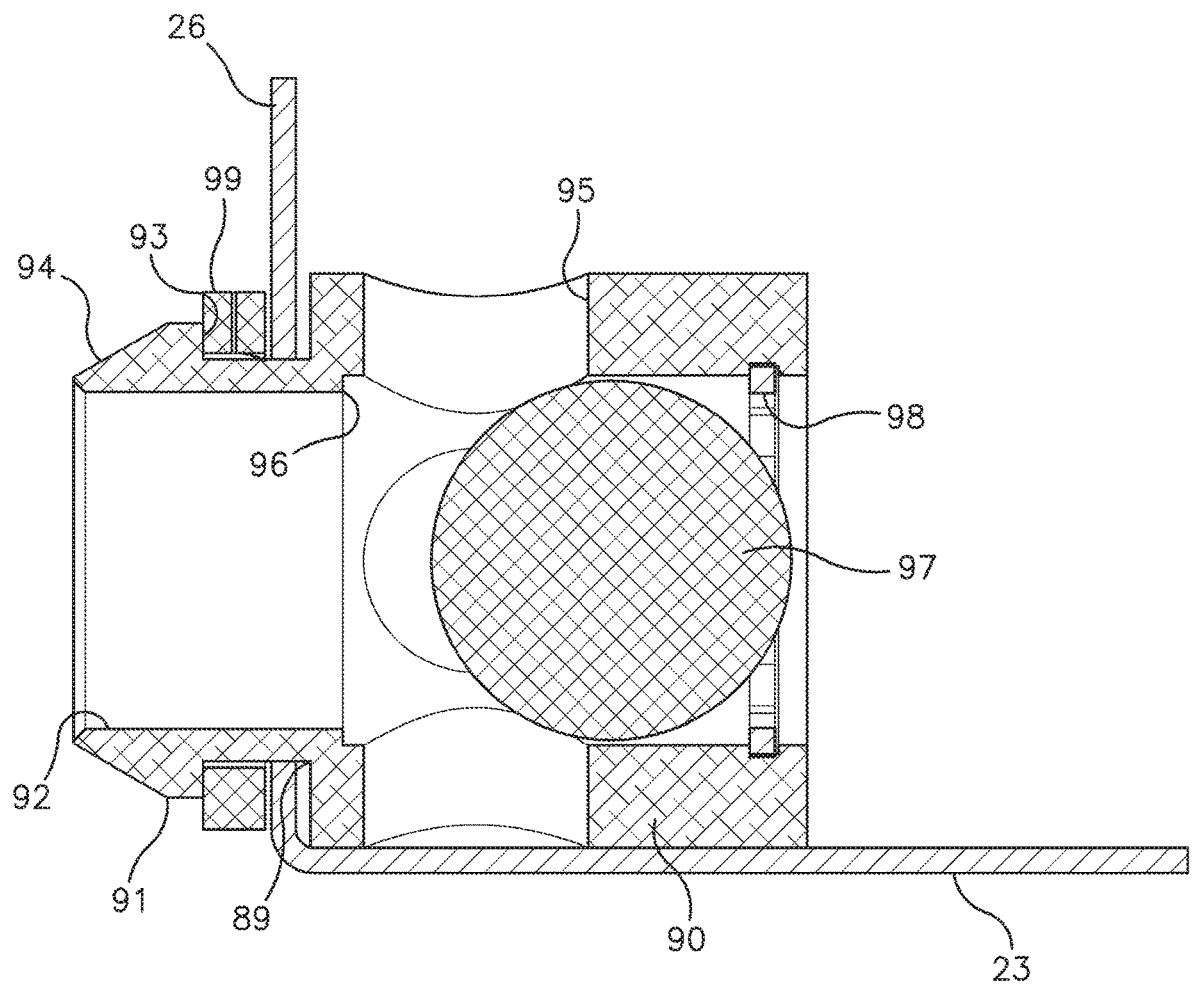
FIG. 12 is a greatly enlarged cross-sectional view of one of the check valves as shown in FIG. 9 connected to the resilient cup with the foam core removed.

In the baffle assembly 65 shown in FIGS. 9 and 10, a plurality of check valves 81 are shown mounted in openings 83 formed in the bottom of a sidewall 85 of a cup 87 of the baffle assembly 65 with a foam core 88 inserted in the cup 87 and extending around the check valves 81. The check valves 81 allow fuel to flow into but not out of the cup 87 through the openings 83. Referring to FIGS. 11 and 12, each check valve 81 includes a valve body 89 including a cylindrical segment or portion 90 and a flared or barbed front end 91 with a central bore 92 extending longitudinally through the body 89. A circumferential recess 93 is formed in the barbed front end 91 between a sloped leading surface 94 on the barbed front end 91 and the cylindrical portion 90. A plurality of radial bores 95 are formed in the cylindrical portion 90 in communication with the central bore 92 and proximate the recess 93. The central bore 92 is wider in the cylindrical portion 90 than in the barbed front end 91, forming a circumferential shoulder 96 between the portions of the central bore extending through the cylindrical portion 90 of the body 89 and the barbed front end 91.

A ball 97 is mounted within the section of the central bore 92 within the cylindrical portion 90 of the body 89 and held therein by a lock ring 98 secured within a groove near the rear end of the cylindrical portion 90. The ball 97 is larger in diameter than the circumferential shoulder 96 such that when the ball 97 rolls against the shoulder 96 the shoulder 96 functions as a valve seat and blocks the flow of fluid past the shoulder 96.

A resilient split washer 99 is used to connect one of the check valves 81 to the cup 23. Each split washer 99 has an internal diameter which is normally narrower than the trailing edge of the sloped surface 94 of the barbed front end 91 but sufficiently resilient to expand to a diameter large enough to pass over the sloped surface 94 and then contract back to its original diameter. The openings 25 in the cup sidewall 26 are sized just narrower than the trailing edge of the sloped surface 94 of the barbed front end 91 of each check valve 81. The cup sidewall 26 is sufficiently resilient to allow the sidewall 26 around each opening 25 to expand around the barbed front end 91 of a check valve 81 when inserted therethrough. The barbed front end 91 is inserted through one of the openings 25 in the cup sidewall 26 from inside the cup 23 until the barbed front end 91 is advanced past the sidewall 26 and the sidewall 26 extends in the circumferential recess 93 of the check valve body 89. The split washer 99, is slid over the barbed front end 91 and into the recess 93 in front of the sidewall 26 to hold the check valve 81 in place within the opening 25 to sidewall 26.

When the automobile in which the tank is mounted is on level ground or on a slope such that the barbed front end 91 of the check valve 81 is elevated relative to cylindrical portion 90, or when the fluid pressure differential from outside of the cup 23 is sufficiently larger than that inside, fuel can flow into the cup 23 past the ball 97. When the tank is oriented with the barbed front end 91 lower than the cylindrical portion 90 or a combination of fuel flow past ball 97 and acceleration are sufficient in a direction from inside the cup 23 toward the outside, the ball 97 rolls into engagement or abutment with the circumferential shoulder 96 preventing fuel in the cup 23 from running out of the cup 23 through that check valve 81. Additionally, should the fuel level inside the cup 23 become sufficiently higher than the fuel level outside of the cup, the fluid pressure differential can become such that ball 97 will remain in engagement with the shoulder 96 and prevent fuel from leaving the cup in a range of slopes and accelerations.

It is foreseen that a fuel siphoning system 63 and the check valves 81 could be used with any of the fuel tank modification systems shown herein including the fuel tank modification system 1 as shown in FIGS. 1-8 and the fuel tank modification system 201 shown in FIGS. 16-19.

Figure 13:
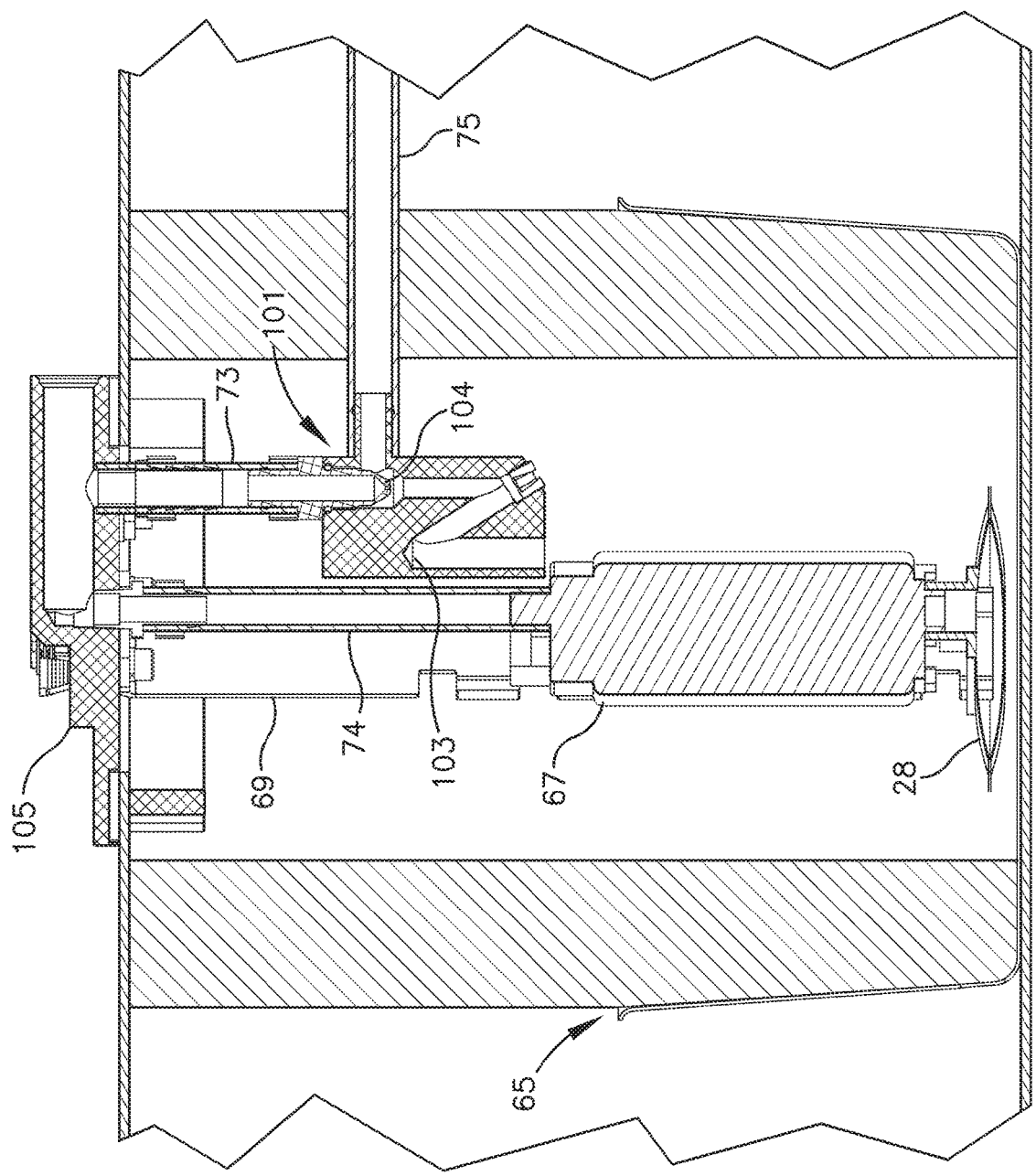
FIG. 13 is a schematic, cross-sectional view of a fuel tank modification system similar to FIG. 9 showing an alternative fuel siphoning system or adapter.
Figure 14:
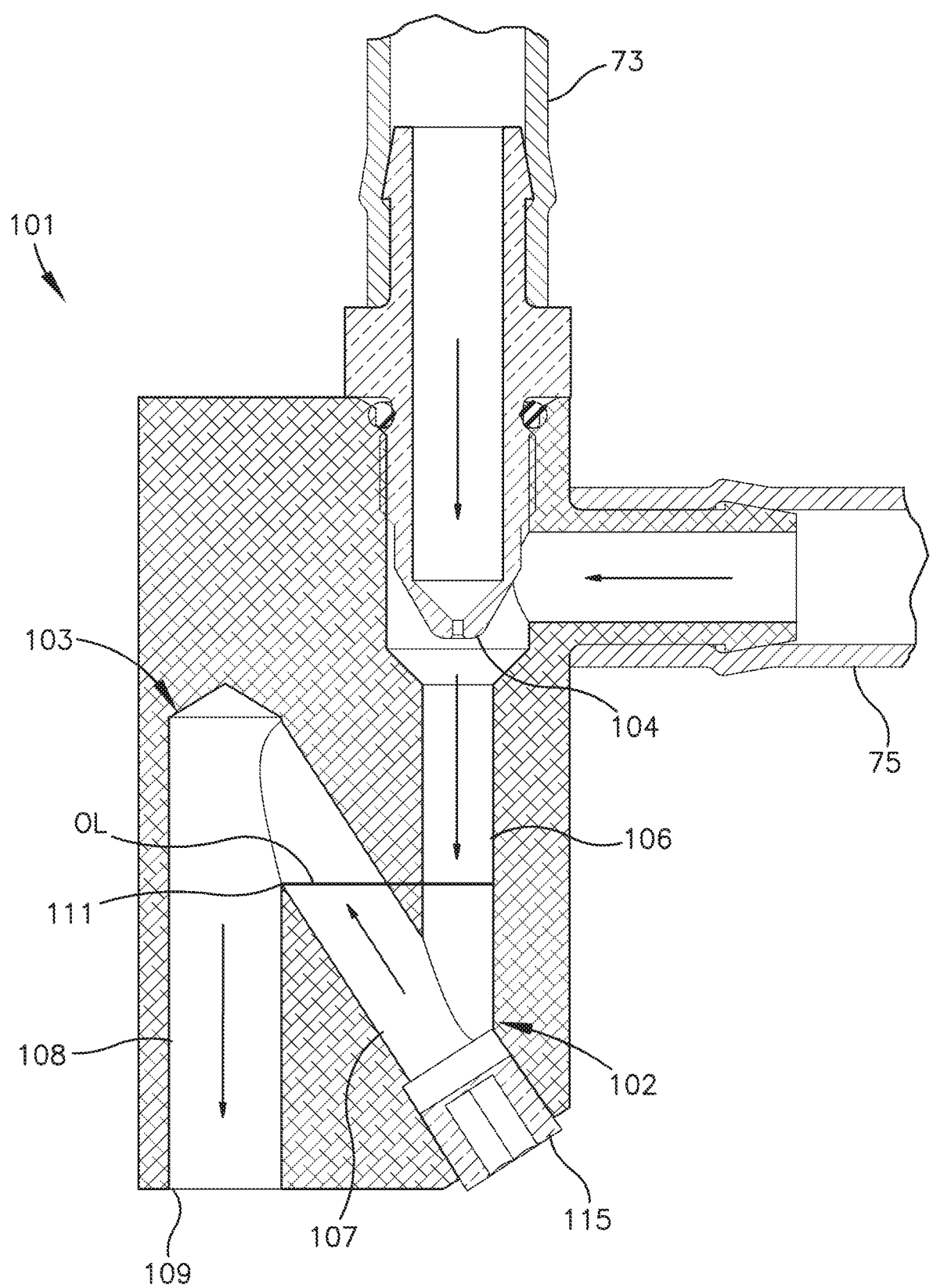
FIG. 14 is an enlarged, schematic, cross-sectional view of the alternative fuel siphoning adapter.

FIGS. 13 and 14 show an alternative embodiment of a fuel siphoning system or adapter 101 which incorporates a trap 102, in the nature of an S-shaped or Z-shaped trap, formed in an outlet passageway 103 of the fuel siphoning adapter 101. The trap 102 retains a quantity of liquid fuel in the outlet passageway 103 after the first use of the siphoning adapter 101 which hydraulically seals the outlet passageway 103 and hastens the siphoning action during subsequent use.

The fuel siphoning adaptor 101 is adapted for siphoning fuel from a point in the fuel tank remote from the baffle assembly 65 surrounding the internally mounted fuel pump 67. It is understood the fuel may be siphoned from any point within the tank such as a sump S or corner, or a separate compartment such as in the case of a saddlebag style tank, or even an entirely separate tank. The fuel siphoning adapter 101 includes a venturi nozzle 104 mounted in-line with a fuel line 73 extending from a cap 105 of the fuel pump mounting assembly 69 into the hollow interior of the baffle assembly 65. Fuel line 73 branches off of a pressurized fuel supply line 74 connected to the pump outlet. A first segment or leg 106 of the outlet passageway 103 in the fuel siphoning adapter 101 also extends vertically, in-line with and downstream of the venturi nozzle 104 and presents an expanded or larger diameter relative to a restriction formed in the outlet end of the venturi nozzle 104.

Fuel siphon tube 75 is connected at a first end to the siphoning adapter 101 near the restriction in the venturi nozzle 104. A second, open end (not shown) of the siphon tube 75 is connected to the bottom of the tank T remote from the baffle assembly 65. The reduction in pressure of returned fuel flowing through the restriction of venturi nozzle 104 and then expanding into the first segment 106 of the outlet passageway 103 of the siphoning adapter 101 draws fuel from the tank T through the open end of the siphoning tube 75 and into the outlet passageway 103 of the fuel siphoning adaptor 101.

A second segment 107 of the outlet passageway 103 angles upward relative to the first segment 106 and then a third segment 108 of the outlet passageway 103 angles back downward and ends at outlet opening 109 formed in the siphoning adapter 101. In the embodiment shown, the second segment 107 of the outlet passageway 103 extends at an angle of approximately thirty to thirty-five degrees away from the first segment 106 and the third segment 108 angles back downward from the second segment 107 at the same or complimentary angle so that the third segment 108 extends approximately vertically.

A horizontal plane extending across a lower edge 111 of a second bend in the trap 102 formed at the intersection of the second and third segments 107 and 108 of the outlet passageway 103, defines the trap weir or overflow level OL of the trap and is located below the restriction in the venturi nozzle 104 and the point of connection of the fuel siphon line 75 to the siphoning adapter 101. With fuel in the trap 102 and when fuel is subsequently injected into the trap 102 through venturi nozzle 104, the fuel level in the trap 102 will almost immediately overflow the overflow level OL, with the plug of fuel then flowing through the trap 102 providing suction for pulling fuel through the fuel siphon line 75 into the outlet passageway in addition to the siphoning effect created by the venturi nozzle 104.

In the fuel siphoning adapter 101 shown in FIGS. 10 and 11, the second segment or leg 107 of the outlet passageway 103 is machined into the adapter body from a corner and the end of the bore is sealed with a plug 115.

It is foreseen that more than one fuel siphoning system could be used with the fuel pump 67 to draw fuel from different locations in the fuel tank T remove from the baffle assembly 65. It is also foreseen that the fuel siphoning adapter 101 with the trap 102 could be used independent of the baffle assembly 65 or with different systems for holding fuel around the fuel pickup for the fuel pump and that the fuel siphoning adapter 101 could be integrated into the cap 105 of the fuel pump mounting assembly or the fuel siphoning adapter 101 could be mounted separately in the fuel tank T.

Figure 15:
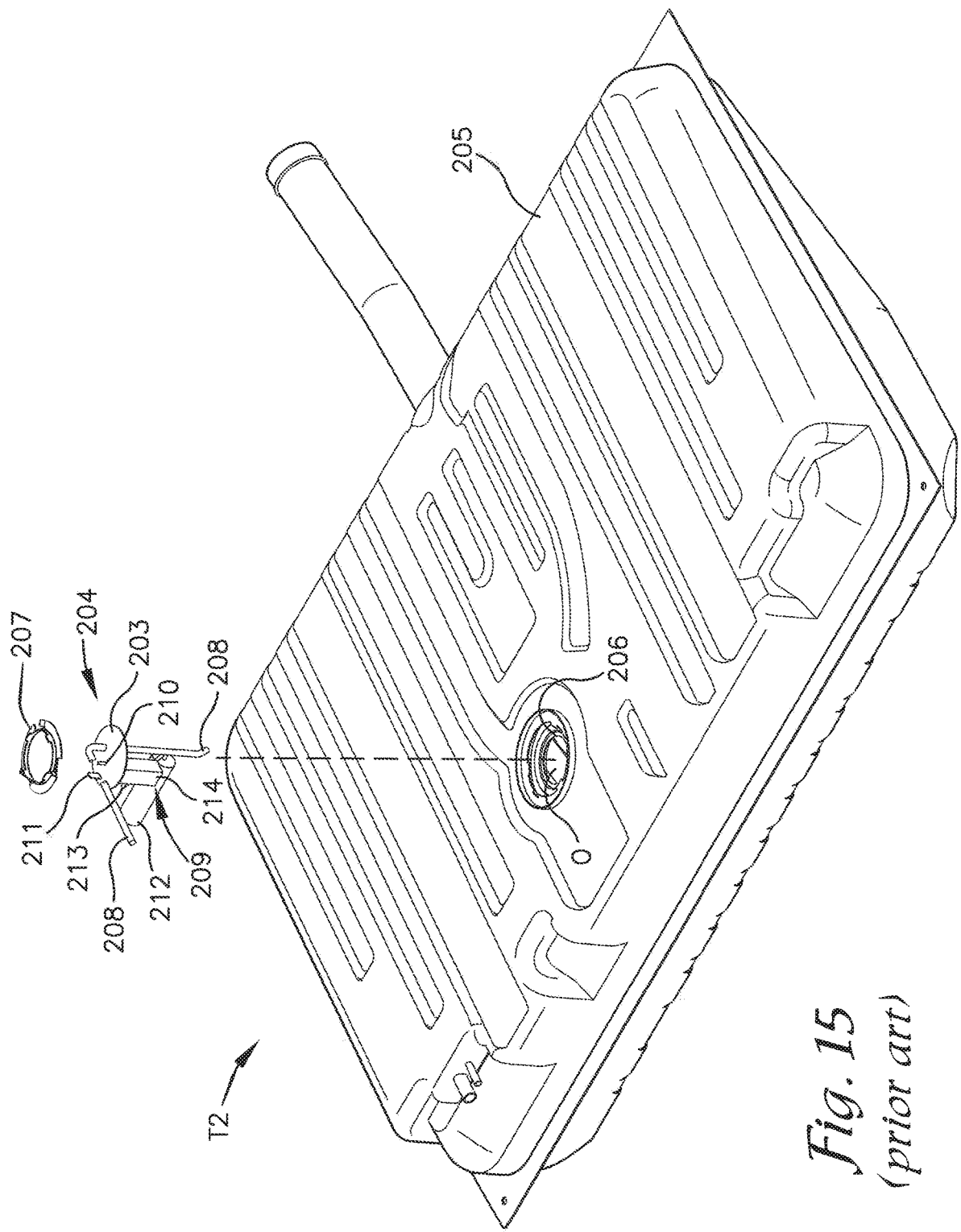
FIG. 15 is an exploded perspective view of a prior art fuel tank showing the fuel sending unit separated from a sending unit opening in the fuel tank.
Figure 16:
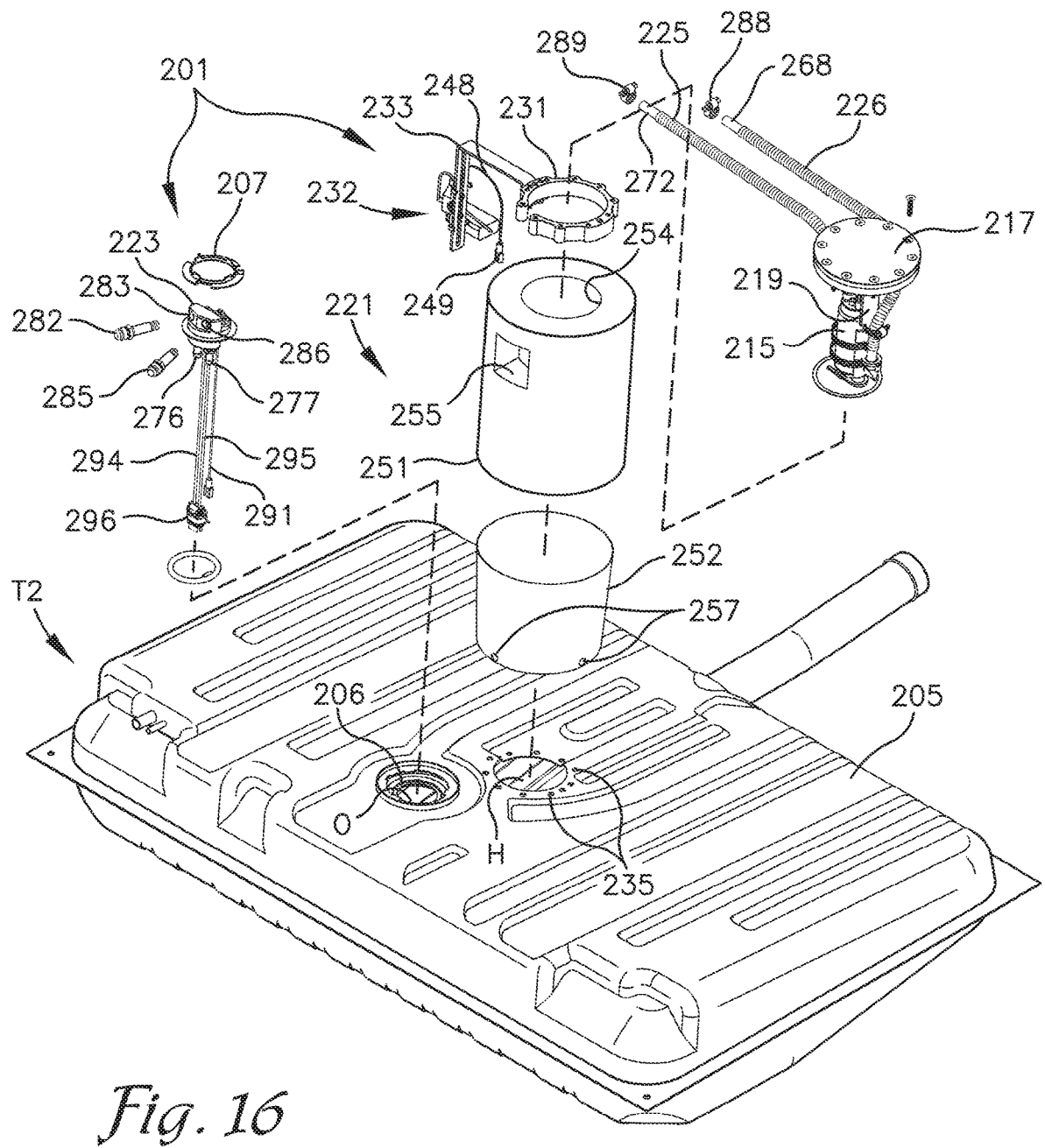
FIG. 16 is an exploded, perspective view of an embodiment of the fuel tank adaptor assembly to be installed in the fuel tank of FIG. 15 in which an access hole has been cut.

FIGS. 16-19 show an alternative embodiment of a fuel tank modification system or adapter assembly 201 for modifying a fuel tank, such as tank T2 shown in FIG. 15. Tank T2 is a standard fuel tank manufactured primarily for aftermarket purchasers looking to replace an existing fuel tank with a correspondingly sized and shaped fuel tank. It is foreseen that the fuel tank adapter assembly 201 may also be used to modify a pre-existing style fuel tank T2 prior to installation as the original fuel tank for the car. The fuel tank T2 includes a sending unit opening O which is sized to receive a cap 203 which is part of an original fuel sending unit 204 provided with fuel tank T2. In the embodiment shown, the opening O is formed in a top wall or panel 205 of the tank T2 above a sump portion or deepest portion of the tank T2. The cap 203 is supported on a shoulder 206 surrounding opening O and formed as part of the top wall 205 of the tank T2 and the cap 203 is secured in place across opening O using a locking ring 207 which is matingly connectable to the top wall 205 of the tank T2.

In addition, to the cap 203, the fuel sending unit 204 shown includes a fuel supply conduit 208 (with portions removed in FIG. 15 to show additional detail on the cap) extending through the cap 203, a fuel level sensor assembly 209 suspended from the cap 203 and a sensor terminal 210 extending through the cap and electrically connected to the fuel level sensor assembly 209 for communicating a signal from the fuel level sensor assembly 208 through the cap 203. The fuel level signal providing information corresponding to the level of fuel in the tank T2. A sensor grounding terminal 211 may also be formed on and extend through the cap 203 to facilitate grounding of the fuel level sensor assembly 209. In the embodiment shown the sensor assembly 209 comprises a float 212 mounted on an arm 213 which is pivotally connected to a sensor base 214 such that the pivoting of the arm 213 relative to the sensor base 214 is used to determine the fuel level. A fuel pump (not shown) mounted external to the tank T2 and flow connected to an end of the fuel supply conduit 208 extending outside of the tank T2 draws fuel from the tank and through the fuel supply conduit 208. A filter (not shown) may be mounted on the end of the fuel supply conduit 208 extending into the tank T2 when the sending unit 204 is mounted in the tank T2

Referring to FIGS. 16-19, the fuel tank adaptor assembly 201 includes a fuel pump 215 which is suspended from a cover plate 217 by a pump mounting assembly 219, a baffle assembly 221, a replacement cap or plug 223 for covering sending unit opening O, a fuel supply line 225, a fuel return line 226, a first power supply conductor segment 228, a first ground conductor segment 229, cover plate mounting ring 231 and a fuel level sensor assembly 232 mounted on a bracket 233 which is connected to the cover plate mounting ring 231.

To allow installation of the fuel tank adaptor assembly 201 in fuel tank T2, an access hole H is cut into the top wall 205 and fastener receiving holes 235 are bored into the top wall 205 in spaced relationship around the access hole H. The spacing of the fastener receiving holes 235 corresponds to the spacing of threaded fastener receiving bores 237 formed in an upper surface of the cover plate mounting ring 231. In the embodiment shown, the cover plate mounting ring 231 is discontinuous and may be described as being a split ring or C-shaped with a gap or break 238 formed between opposite ends thereof. The gap 238 facilitates insertion of the ring 231 into the tank T2 through the access hole H.

In the embodiment shown, the sensor assembly mounting bracket 233 is an L-shaped bracket with a horizontal leg 240 and vertical leg 241. The horizontal leg 240 is connected at a first end to the ring 231. In the embodiment shown, a flange on the first end of the horizontal leg 240 is bolted to the underside of the mounting ring 231. The vertical leg 241 is connected to and depends from a second end of the horizontal leg 240 in spaced relation from the first end and the mounting ring 231. The fuel level sensor assembly 232 is mounted on the vertical leg 241, on the side opposite the mounting ring 231 so that the sensor assembly 232 is supported outside of the baffle assembly 221.

The fuel level sensor assembly 232 includes a float 244 mounted on the distal end of a float arm 245 which is pivotally connected proximate its inner end to a sensor base 246. The sensor base 246 is mounted on the vertical leg 241 of the sensor assembly mounting bracket 233 and translates the pivoting of the inner end of the float arm 245 relative thereto into a signal indicative of the level of fuel in the tank T2. A first sensor signal conductor segment 248 is connected to and extends outward from the sensor base 246 with a first or male connector 249 formed on a distal end thereof. A sensor ground wire 250 is connected between the sensor base 246 and the vertical leg 241 of the sensor mounting bracket 233.

In the embodiment shown, baffle assembly 221 may be similar to the baffle disclosed in U.S. Pat. No. 9,567,954 which is incorporated herein by reference and as described previously herein. The baffle assembly 221 includes a compressible foam core 251 and a compressible cup 252 formed of an elastomeric material. A central bore 254 is formed in the foam core 251 to receive the pump 215 such that the foam core 251 may be described as annular. An access hole 255 is formed in one side of the foam core 251 and through which the fuel supply and return lines 225 and 226 and the first power supply and ground wire segments 228 and 229 for the pump 215 may be routed for connection to the replacement cap 223 as discussed hereafter. Openings 257 are formed in a sidewall 258 of the cup 252 near a lower end thereof. The openings 257 allow fuel to flow into the cup 252 but slow the flow of fuel out of the cup 252 during turns and other movement of the vehicle. Check valves 81 as shown in FIGS. 10-12 may be secured within the openings 257 to allow fuel to flow into but not out of the cup 252.

Figure 17:
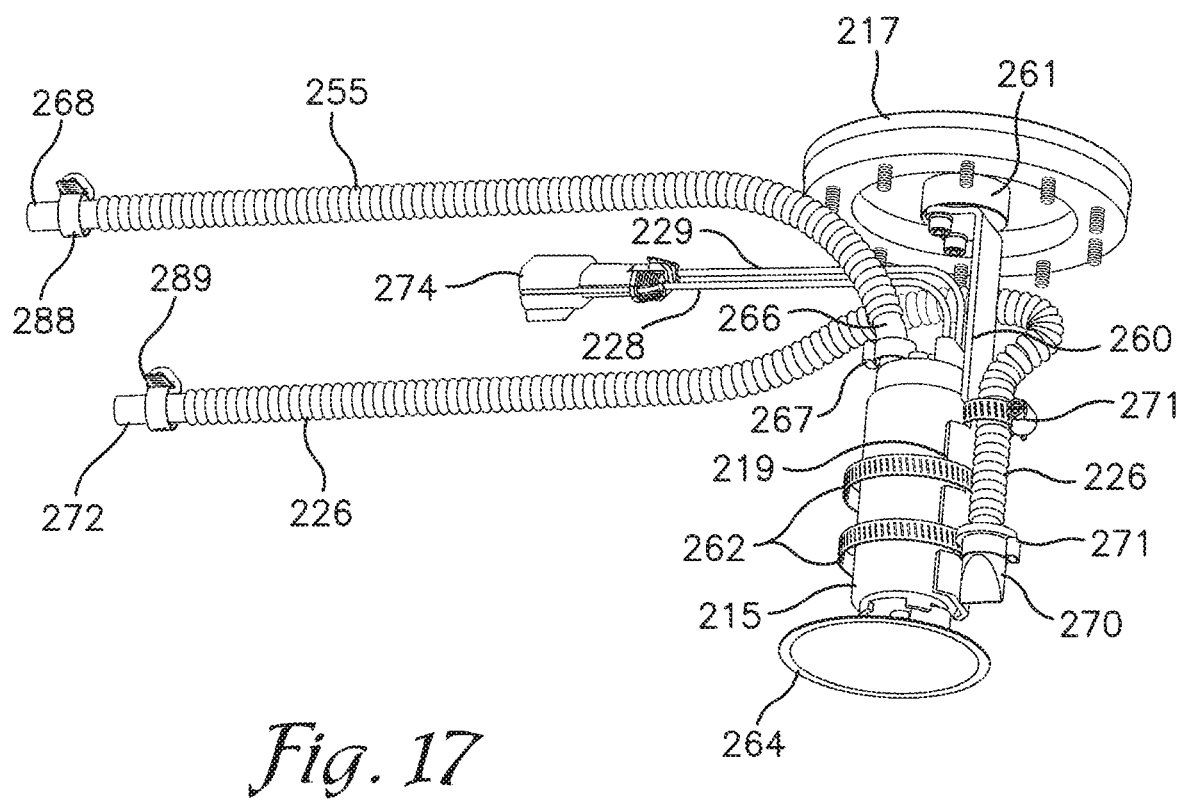
FIG. 17 is an enlarged, bottom, perspective view of a fuel pump mounted on a fuel pump mounting assembly as part of the fuel tank adaptor assembly.
Figure 18:
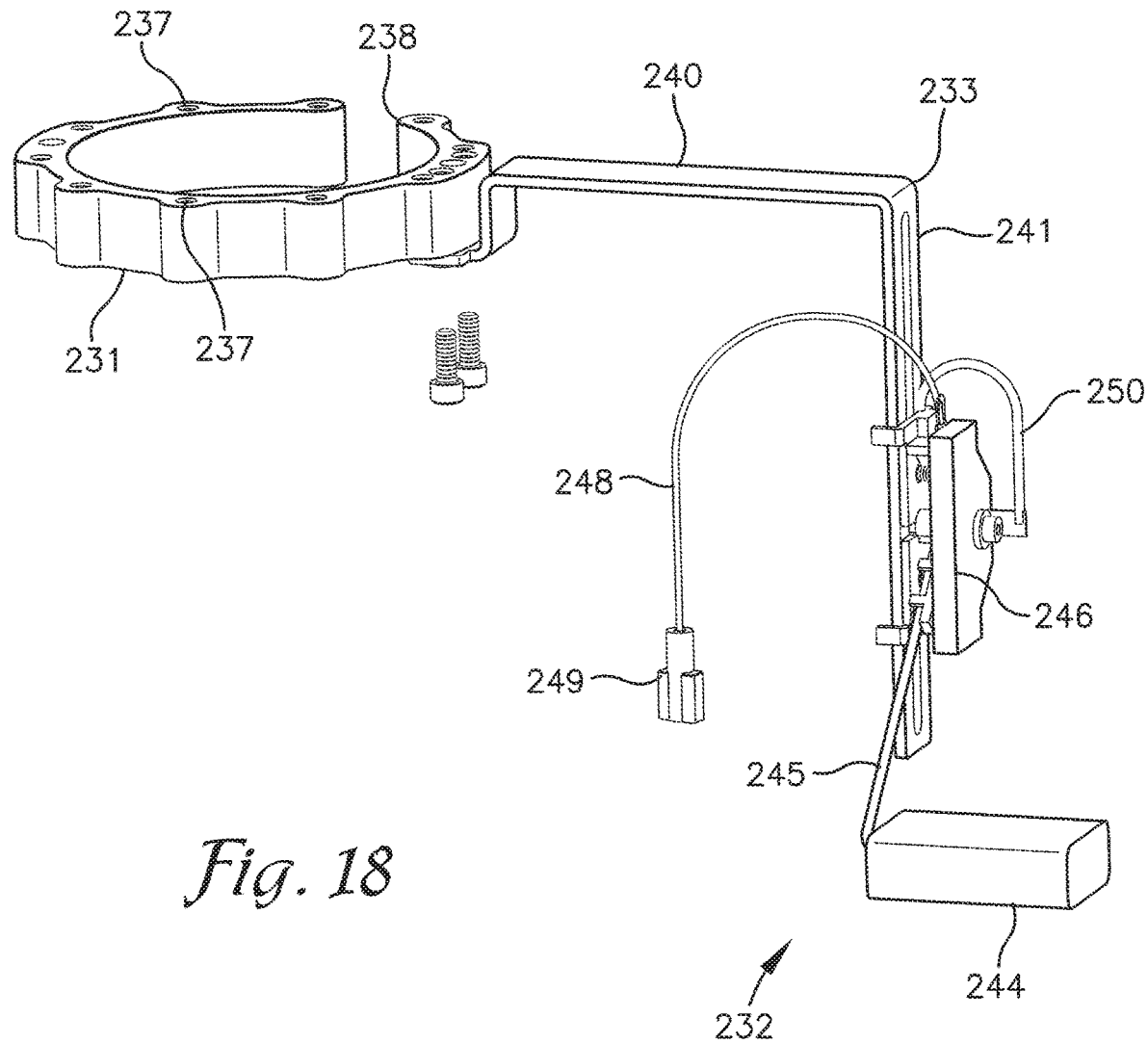
FIG. 18 is an enlarged, rear perspective view of a mounting ring, mounting bracket and fuel level sensor assembly as part of the fuel tank adaptor assembly.
Figure 19:
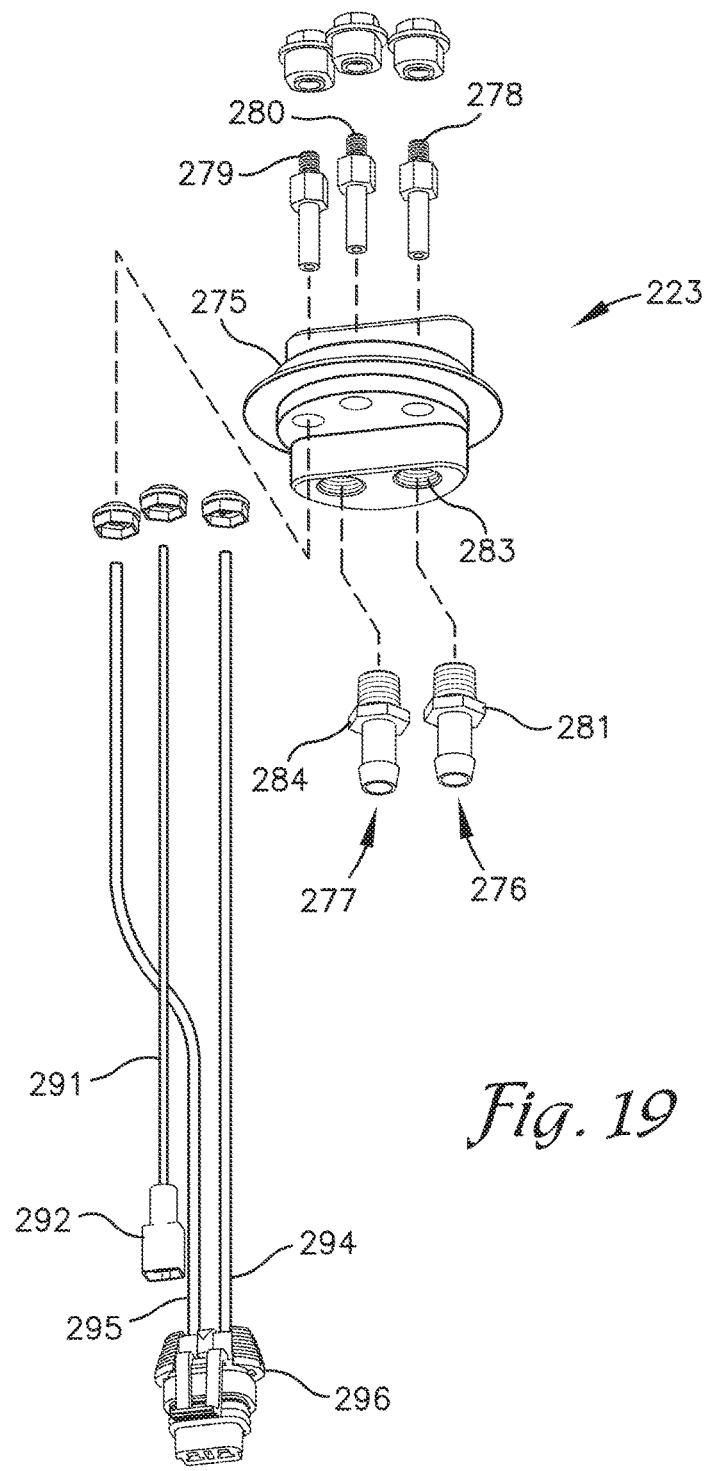
FIG. 19 is an exploded, enlarged, bottom perspective view of a replacement cap 223 of the fuel tank adaptor assembly for covering the sending unit opening in the tank.
Figure 20:
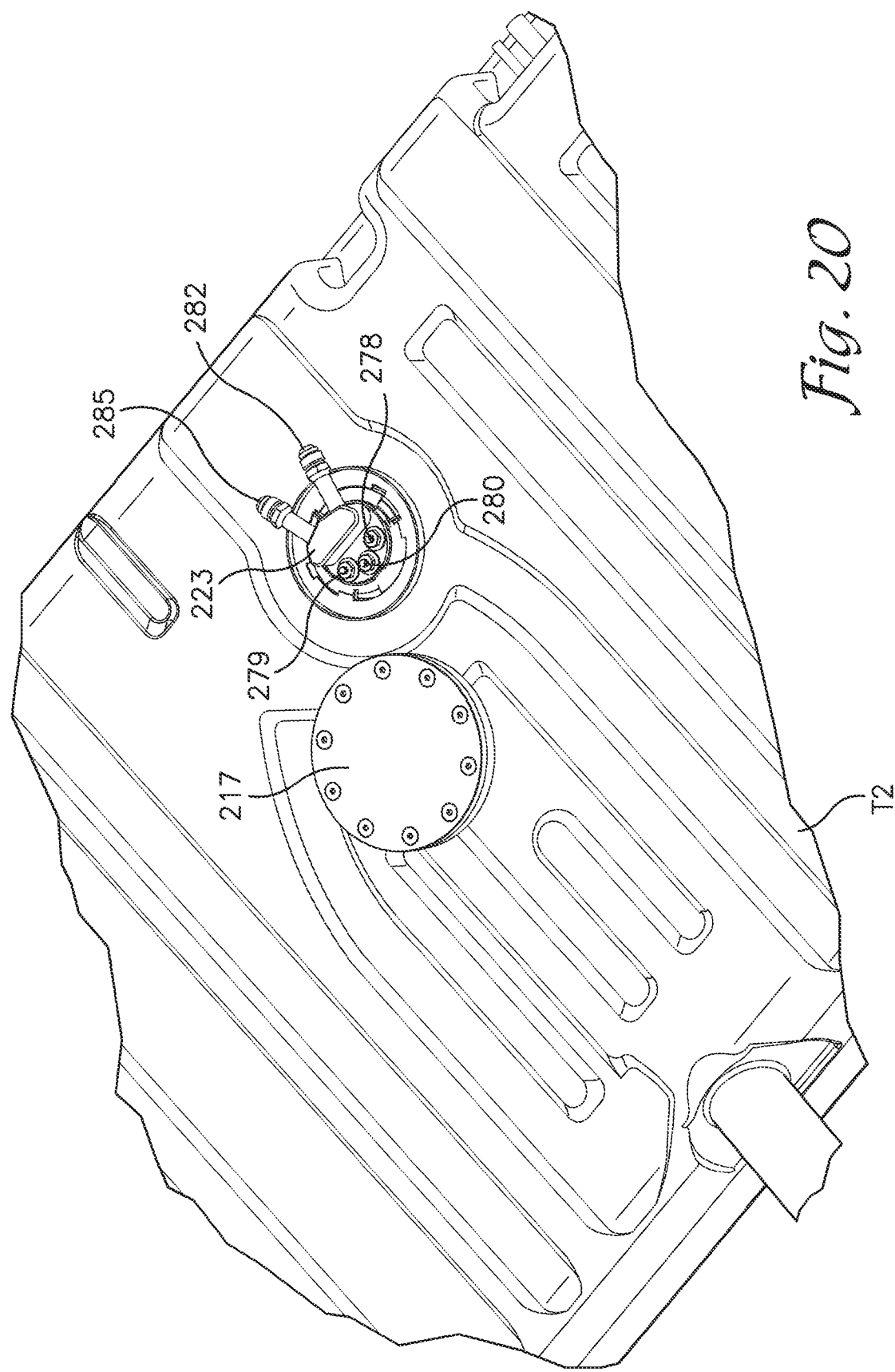
FIG. 20 is a top plan view of the fuel tank of FIG. 15 with the fuel tank adaptor assembly installed.

The mounting of the pump 215 on pump mounting assembly 209 may also be similar to the mounting of the pump and pump mounting assembly as in U.S. Pat. No. 9,567,954, the contents of which are incorporated herein by reference. Referring to FIG. 17, the fuel pump 215 is mounted on a pump hangar bracket 260 which is bolted to and depends from a boss 261 formed on the underside of the cover plate 217. Hose clamps 262 may be used to secure the pump 215 to the hangar bracket 260. The fuel pump 215 connected to and suspended from the cover plate 217 may be referred to as the fuel pump module. A fuel pickup 264 is connected to and extends below the fuel pump 215 with the fuel pickup 264 flow connected to the fuel pump 215 through a fuel inlet (not shown) in the fuel pump 215. A first end 266 of the fuel supply line 225 is connected to an outlet 267 of the fuel pump 215, at an upper end thereof. A second end 268 of the fuel supply line 225 is adapted to be connected to the replacement cap 223 as discussed hereafter. A discharge end 270 of the fuel return line 226 is connected to the pump hangar bracket 260 using one or more hose clamps or receivers 271 so that any fuel returned to the tank T2 through the return line 226 is discharged into the tank T2 within the cup 258 and near the fuel pickup 264. An intake end 272 of the fuel return line 226 is adapted to be connected to the replacement cap 223 as discussed hereafter. The fuel supply line 225 and the fuel return line 226 are formed from flexible conduit that is sized longer than the distance between the access hole H and sending unit opening O in the tank T2 and also longer than the intended points of connection of the fuel supply line 225 and fuel return line 226 between the pump 215 and the replacement cap 223. A first or female connector 274 is shown connected to distal ends of the first power supply and ground conductor segments 228 and 229 respectively.

The replacement cap 223 comprises a cap body 275, a supply line conduit 276, a return line conduit 277, and first, second and third terminals, 278, 279 and 280 extending through the cap body 275. The supply line conduit 276 is formed by an in-tank supply line fitting 281 and an external supply line fitting 282 secured within a supply line bore 283 formed through the replacement cap 223. The return line conduit 277 is formed by an in-tank return line fitting 284 and an external return line fitting 285 secured within a return line bore 286 formed through the replacement cap 223. The in-tank supply line and return line fittings 281 and 284 may be ⅛ inch NPT by 5/16 inch brass hose barbs. The external supply line and return line fittings 282 and 285 may be −6 ORB to −6 AN fittings.

The second end 268 of the in-tank supply line 225 is securable to the in-tank supply line fitting 281 using a hose clamp 288 to flow connect the in-tank supply line 225 with an external supply line (not shown) which is connected at a first end to the external supply line fitting 282 and at an opposite end to the fuel injection system or carburetor for a vehicle engine. The intake end 272 of the in-tank return line 226 is similarly securable to the in-tank return line fitting 284 using a hose clamp 289 to flow connect the in-tank return line 226 with an external return line (not shown) which is connected at a first end to the external return line fitting 285 and at an opposite end to a return line from a fuel injection system for the vehicle.

The terminals 278-280 may be conventional, insulated terminal pins. In the embodiment shown, a second sensor signal conductor segment 291 is connected at a first end to the third terminal 280 and a second or female connector 292 is mounted on a second or distal end of the second sensor signal conductor segment 291. Female connector 292 of the second sensor signal conductor segment 291 is connectable to the male connector 249 of the first sensor signal conductor segment 248 to form a signal transmission connection between the sensor base 246 and the third terminal or sensor signal terminal 280 within tank T2.

A second power supply conductor segment 294 and second ground conductor segment 295 are connected at first ends to the first and second terminals 278 and 279 respectively and at second ends to a second or male connector 296. Male connector 296 is connectable to the female connector 274 to electrically or conductively connect the first power supply conductor segment 228 to the second power supply conductor segment 294 and the first ground conductor segment 229 to the second ground conductor segment 295 respectively within tank T2. An external power supply wire or conductor (not shown) is connected to the first terminal or power supply terminal 278 on the external side of the replacement cap 223 to supply power to pump 215. In addition, an external ground wire (not shown) is connected to the second terminal or ground terminal 279 on the external side of the replacement cap 223 to electrically ground the pump 215. An external sensor signal conduit (not shown) is connected to the third terminal 280 to transmit a fuel level signal transmitted through the sensor signal conductor segments 248 and 291 from the fuel level sensor assembly 232 to a fuel level indicating system in the vehicle.

The replacement cap body 275 is sized and shaped to be supported on the shoulder 206 of the tank top wall 205 and such that the locking ring 207 can be used to secure the replacement cap 223 to the tank T2 and across the sending unit opening O. The cover plate 217 is preferably formed as a relatively thin disc sized large enough in diameter to cover the hole H formed in the top of the tank T2 through which the pump 215, and compressed baffle assembly 221 may be inserted for installation in the tank T2.

Initial steps for installing the fuel tank adaptor assembly 201 comprise removing the locking ring 207 and the original fuel sending unit 204 from the sending unit opening O in the fuel tank T2 and then cutting the access hole H in the top wall 205 of fuel tank T2 and boring fastener receiving holes 235 around the access hole H. The fuel pump 215 is connected to the cover plate 217 by mounting the pump 215 on the pump hangar bracket 260 and securing it in place with hose clamps 262. The first power supply conductor segment 228 and first ground conductor segment 229 are connected at their first ends to the fuel pump 215. A replacement cap 223 is provided with the supply line conduit 276 and return line conduit 277 and first, second and third terminals 278-290 extending therethrough. The second power supply conductor segment 294 and second ground conductor segment 295 are connected to the first and second terminals 278 and 279 respectively.

The cover plate mounting ring 231 with the mounting bracket 233 and fuel level sensor assembly 232 connected thereto are inserted into the tank T2 through the access hole H. The mounting ring 231 is positioned within the tank T2 so that the fastener receiving bores 237 therein align with fastener receiving holes 235 cut into the top wall 205 of the tank T2 and such that the mounting ring 231 is axially aligned with the access hole H and then bolted in place to the top wall 205 of the tank T2. The baffle assembly 221 is inserted into the tank T2 through access hole H and mounting ring 231 by compressing the compressible cup 252 and the foam core 251, passing the baffle assembly 221 through access hole H and mounting ring 231 and then allowing the foam core 251 to expand, expanding the cup 252 and biasing it against an inner, bottom surface of the tank T2.

The cover plate 217 and in-tank fuel pump 215 are then placed outside of the fuel tank T2 and proximate the access hole H. The first end 266 of the fuel supply line 225 is connected to the outlet 267 of the in-tank fuel pump 215. A second end 268 of the fuel supply line 225 is threaded through the access hole H in tank T2, through the access hole in the foam core 251 of baffle assembly 221, and out the sending unit opening O. Using hose clamp 288, the second end 268 of the fuel supply line 225 is connected to the in-tank supply line fitting 281 which forms the in-tank end of the supply line conduit 276 on the replacement cap 223.

The fuel return line 226 is inserted into the fuel tank T2 through the access hole H and the discharge end 270 of the fuel return line 226 is connected to the pump hangar bracket 260, in the central bore 254 of foam core 251, using hose clamp 262 so that the discharge end 270 is directed downward toward the fuel pickup 264. An intake end 272 of the fuel return line 216 is threaded through the access hole 255 in the foam core 251, through the tank T2 and out the sending unit opening O. The intake end 272 of return line 216 is then connected to the in-tank return line fitting 284 on the cap 223, using hose clamp 289 so that the return line is connected to the return line conduit 277 through the replacement cap 223.

The first power supply conductor segment 228 and the first ground conductor segment 229 are connected to the second power supply conductor segment 294 and the second ground conductor segment 295 respectively within the tank T2 by connecting the female connector 274 to the male connector 296. The connected first and second power supply conductor segments 228 and 294 form a power supply conductor connected within tank T2 between the in-tank fuel pump 215 and the first terminal or power supply terminal 278 extending through the replacement cap 223. The connected first and second power supply conductor segments 229 and 295 form a ground conductor connected within tank T2 between the in-tank fuel pump 215 and the second terminal ground conductor terminal 279 extending through the replacement cap 223.

With the fuel line connections and pump power supply and ground wire connections completed, the fuel pump 215, mounted on the pump mounting assembly 219 connected to cover plate 217 is inserted into the tank T2 through the access hole H and the cover plate 217 is bolted to the mounting ring 231 with the portion of the top wall 205 around the access hole H extending between the cover plate 217 and mounting ring 231. The replacement cap 223 is then positioned across sending unit opening O with an outer edge of the cap body 275 supported on the shoulder 206 and the locking ring 207 is installed to secure the replacement cap 223 to the fuel tank T2 in covering relationship across the sending unit opening O. The cover plate 217 and replacement cap 223 are secured in position across the access hole H and sending unit opening O with the fuel supply and return lines 225 and 226 completely within the fuel tank T2 and the electrical connections between the fuel pump 215 and first and second terminals 278 and 279 on the replacement cap 223 and the electrical connection between the fuel level sensor assembly 232 and the third terminal 280 on the replacement cap 223 completely within the fuel tank T2.

The venturi type siphoning adapter 63 as shown in FIGS. 9 and 13 could be used with the fuel tank adaptor assembly 201 by connecting the pressurized fuel inlet of the siphoning adapter 63 to receive a stream of pressurized fuel from the fuel supply line 225 and which is directed through the restriction in the siphoning adaptor to create suction in the siphon tube 75 connected to the siphoning adapter 63 at a siphon inlet thereof. A second end of the siphon tube is connected to or mounted in the fuel tank outside of the baffle and the discharge from the siphoning adapter 63 is positioned to discharge fuel into the baffle assembly 221 so that fuel can be drawn from a position remote from the baffle assembly 221 and discharged therein.

Figure 21:
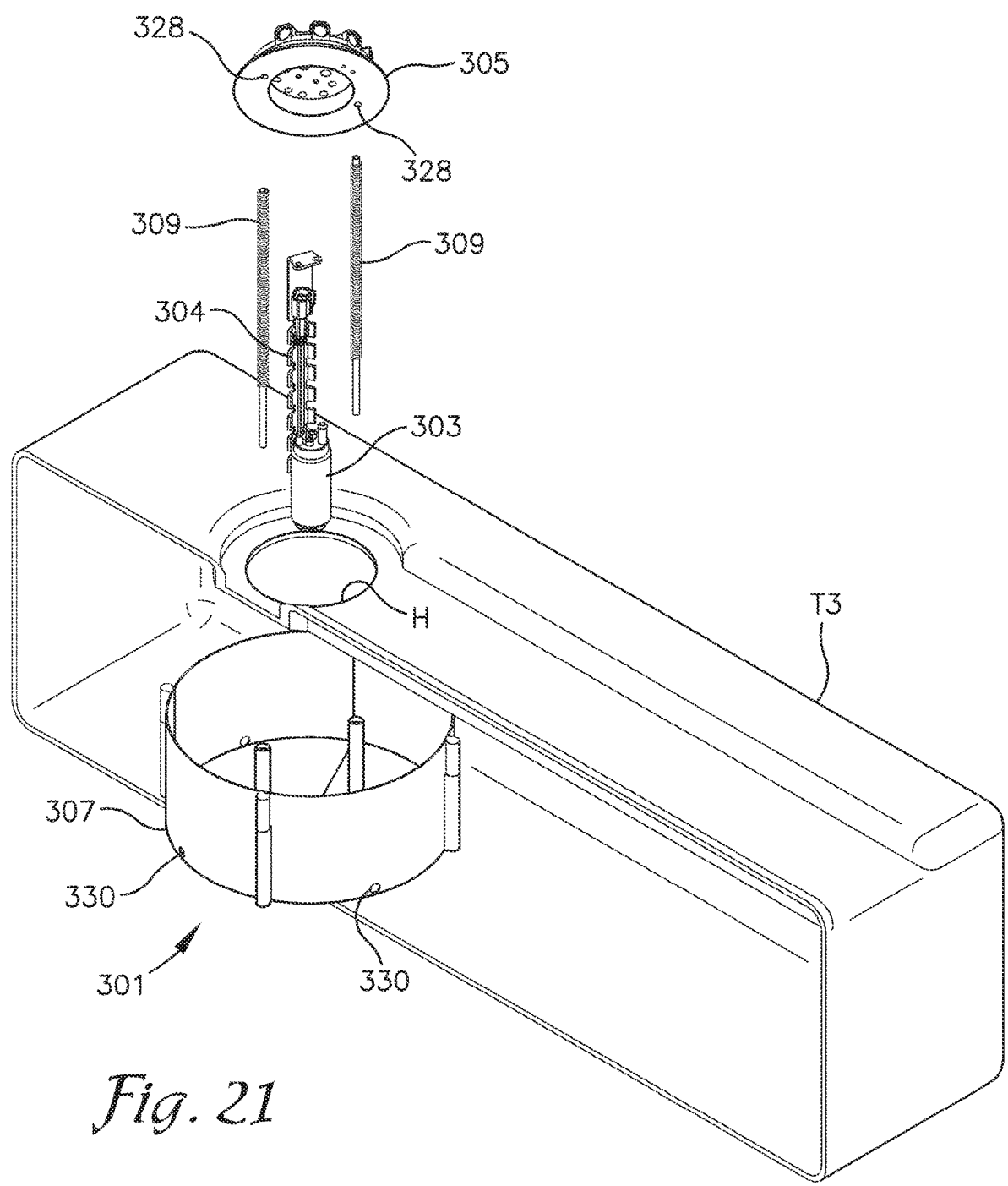
FIG. 21 is an exploded, cross sectional view of a fuel tank incorporating an alternative embodiment of an in-tank fuel pump assembly incorporating an alternative baffle assembly formed from a plurality of segments secured together in the tank and held in place with spring loaded rods.
Figure 22:
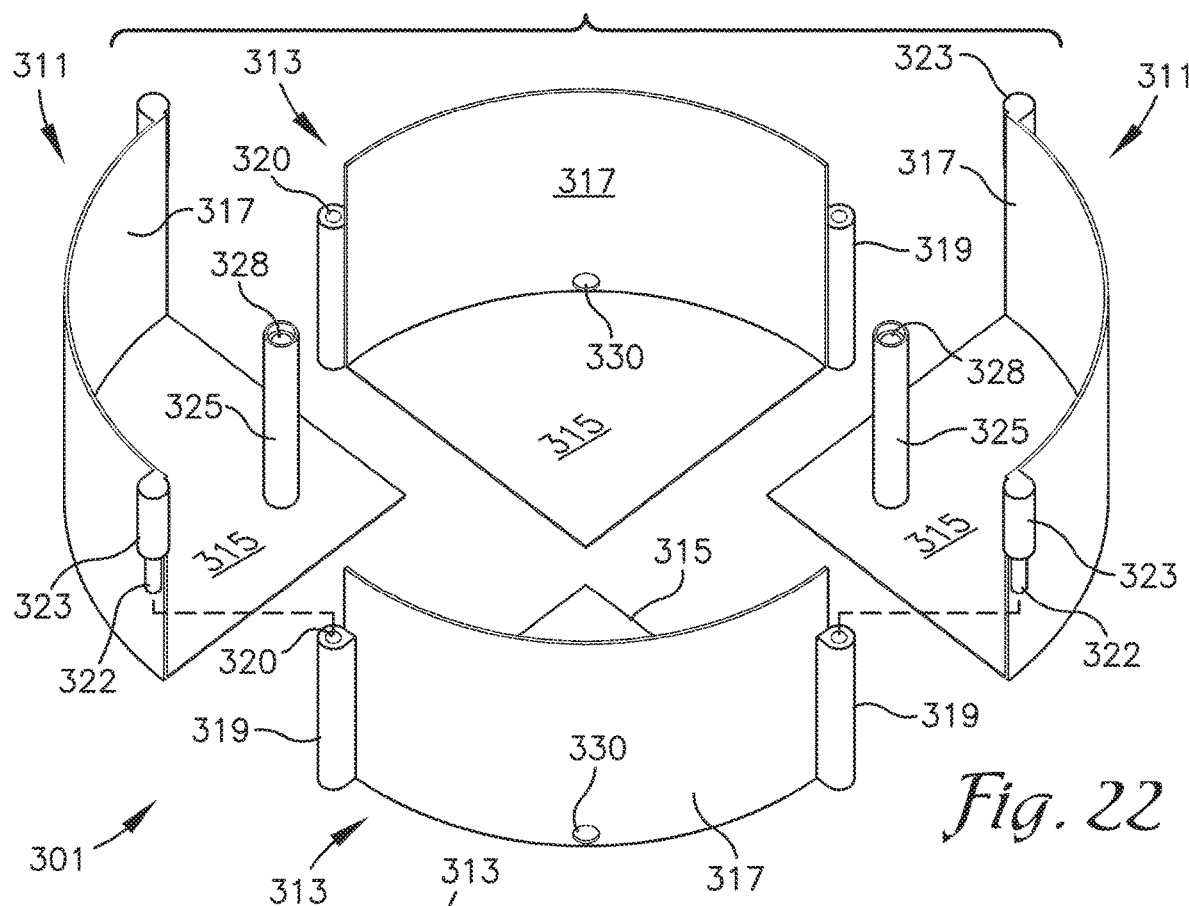
FIG. 22 is an enlarged and exploded perspective view of the baffle assembly shown in FIG. 21.
Figure 23:
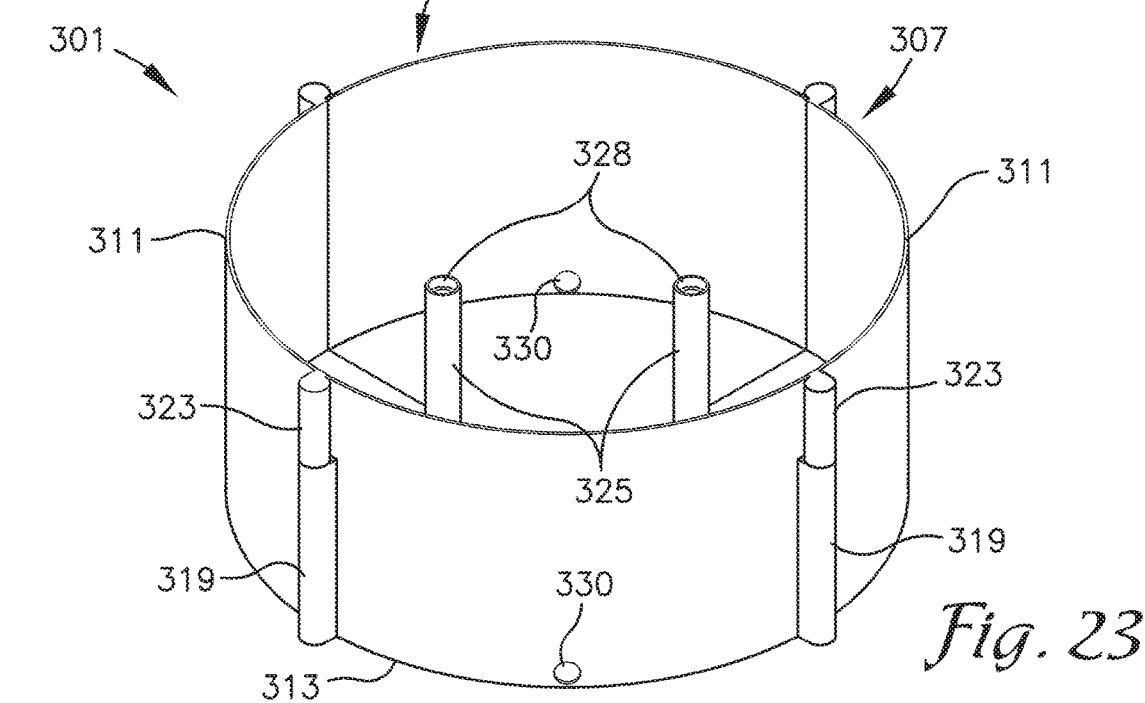
FIG. 23 is an enlarged, perspective view of the baffle assembly shown assembled.

FIGS. 21-23 show an alternative embodiment of a baffle assembly 301 for inserting into a fuel tank T3 through an access hole H formed in the tank and into which a fuel pump 303 may be inserted. The pump 303 is mounted on a pump hangar bracket 304 which is connected to the underside of a cap 305 sized to cover the access hole H. In the embodiment shown, the cap 305 is of the type through which fuel supply line and return line connections are made and through which electrical connections to the pump 303 are made. However, it is foreseen that the alternative baffle assembly 301 could be used with other embodiments including the fuel tank adaptor assembly 201 shown in FIG. 16.

The baffle assembly 301 includes a segmented fuel basket or cup 307 and a pair of spring loaded mounting rods 309 for holding the assembled fuel basket 307 against the bottom of the fuel tank T2. In the embodiment shown, the segmented fuel basket 307, is formed from a plurality of interlocking circle sector segments and more specifically, two male segments 311 and two female segments 313. Each of the segments 311 and 313 includes a base or floor 315 formed as a circle sector and an arcuate sidewall 317 which extends upward from the arcuate edge of the base 315. A cylindrical pin receiver 319 is formed on each of the outer edges of the arcuate sidewall 317 of each female segment 313 with an upwardly opening pin receiving bore 320 formed in each pin receiver 319. The pin receivers 319 extend upward from the bottom of the female segment 313 and end medially between the top and bottom of the sidewall 317. A connecting pin 322 is mounted on each of the outer edges of the arcuate sidewall 317 of each male segment 311. Each connecting pin 322 is formed with and projects downward from a pin base 323 that is formed at or proximate the upper end of one of the arcuate sidewall edges of the male segment 311.

The segmented cup is formed inside of the tank T3 by first inserting the female segments 313 individually into the tank T3 through access hole H and positioning the segments 313 tip to tip in an opposing alignment. A first of the male segments 311 is then inserted into the tank T3 into one of the circular sector shaped gaps between the female segments 313 such that the connecting pins 322 on the male segment 311 extend into the pin receivers 319 on the adjacent female segments 313. A second of the male segments 311 is then inserted into the tank T3 into the remaining circular sector shaped gap between the female segments 313 such that the connecting pins 322 on the male segment 311 extend into the pin receivers 319 on the adjacent female segments 313 to complete the assembly of the cup 307.

A rod receiving boss 325 is formed on the base 315 of each male segment 311. An upwardly opening, expansion rod receiving bore 326 is formed in each boss 325. A lower end of one of the spring-loaded mounting rods 309 is inserted into the rod receiving bore 326 of the rod receiving boss 325 of each male segment 311 with the rod 309 extending upward within the tank T3 and through the access hole H. Opposed rod receiving bores 328 are formed in the bottom of the cap 305. The rod receiving bores 328 in the bottom of the cap 305 are aligned with and positioned over the upper ends of the spring-loaded mounting rods 309 when the cap 305 is positioned over the access hole H and then bolted to the upper wall of the tank T3. The spring-loaded mounting rods 309 are compressed when the cap 305 is secured in place causing the spring-loaded mounting rods 309 to exert a biasing force against the male segments 311 of the assembled, segmented cup 307, holding it in place against the bottom of the tank T3.

The rod receiving bosses 325 and rod receiving bores 328 in the cap 305 are spaced apart a distance to allow the pump 303, suspended from the cap 305, to extend between the spring-loaded mounting rods 309 and bosses 325. Abutment of the base 323 of each connecting pin 322 on the male segments 311 against the upper surface of each pin receiver 319 on the female segments 313 acts to hold the female segments down against the bottom of the tank T3 due to the biasing force of the spring-loaded mounting rods 309 acting on the male segments. Drain holes 330 are formed in the arcuate sidewalls 317 of each of the male and female segments 311 and 313. The drain holes 330 may be sized and positioned to receive one of the check valves 81 therein.

It is to be understood that while certain forms of the present invention have been illustrated and described herein, it is not to be limited to the specific forms or arrangement of parts described and shown.

What is claimed and desired to be secured by Letters Patent is as follows:

1. A method of mounting a fuel pump in a fuel tank having an original fuel sending unit removably secured within a sending unit opening formed in the tank, the original fuel sending unit comprising a cap removably securable across the sending unit opening formed in the tank and having at least an original supply line conduit extending therethrough and an original fuel level sensor assembly connected to the cap and extending into the fuel tank when the cap is secured across the sending unit opening, the original fuel level sensor assembly electrically connected to a first sensor terminal extending through the cap, the method comprising the steps of:
    removing the original fuel sending unit from the sending unit opening in the fuel tank;
    providing a replacement cap for securement in covering relationship with the sending unit opening of the fuel tank, the replacement cap including a supply line conduit and a return line conduit extending therethrough and first and second terminals extending therethrough;
    forming an access hole in the fuel tank;
    connecting the fuel pump to a cover plate sized to cover the access opening with the fuel pump and cover plate forming a fuel pump module;
    connecting a fuel supply line between an outlet of the fuel pump and an in-tank end of the supply line conduit of the replacement cap;
    connecting an intake end of a fuel return line to an in-tank end of the return line conduit and positioning a discharge end of the fuel return line in the fuel tank;
    connecting a power supply conductor between the in-tank fuel pump and the first terminal extending through the replacement cap;
    connecting a ground conductor between the in-take fuel pump and the second terminal extending through the replacement cap;
    inserting the fuel pump module into the tank through the access hole and securing the cover plate to the tank in covering relationship across the access hole with the fuel pump suspended in the fuel tank from the cover plate; and
    securing the replacement cap to the fuel tank in covering relationship across the sending unit opening.

2. The method as in claim 1 wherein the step of providing the replacement cap for securement in covering relationship with the sending unit opening of the fuel tank includes providing the replacement cap having a third terminal extending therethrough, and the method further comprises: inserting a fuel level sensor assembly into the fuel tank through the access hole and mounting the fuel level sensor assembly in the fuel tank; and connecting a fuel level sensor signal conductor between the fuel level sensor and the third terminal extending through the replacement cap.

3. The method as in claim 2 further comprising providing a mounting ring sized for insertion into the tank through the access hole and positioning the mounting ring against the tank around the access hole and bolting the cover plate to the mounting ring to secure the cover plate to the tank and wherein the step of mounting the fuel level sensor assembly in the fuel tank comprises mounting the fuel level sensor assembly on a bracket connected to the mounting ring and the fuel level sensor assembly and bracket are inserted into the fuel tank upon insertion of the mounting ring therein.

4. The method as in claim 1 wherein prior to inserting the fuel pump into the fuel tank the method further comprises the step of inserting into or forming in the fuel tank a baffle positioned to surround an intake to the fuel pump when inserted into the fuel tank.

5. The method as in claim 4 wherein at least one check valve is positioned in an opening through the baffle to allow fuel to flow therethrough into but not out of the baffle.

6. The method as in claim 4 further comprising connecting a siphoning adapter to receive a stream of pressurized fuel from the fuel pump to create suction in a siphoning tube connected at a first end to the siphoning adapter and the method further comprises connecting a second end of the siphon tube in the tank remote from the baffle such that pumping of fuel through the siphoning adapter draws fuel from the tank through the siphon tube and the siphoning adaptor and discharges the siphoned fuel inside of the baffle.

7. A method of mounting a fuel pump in a fuel tank having a top wall and an original fuel sending unit removably secured within a sending unit opening formed in the fuel tank, the original fuel sending unit comprising a cap removably securable across the sending unit opening formed in the tank and having a single conduit comprising an original supply line conduit extending therethrough and an original fuel level sensor assembly connected to the cap and extending into the fuel tank when the cap is secured across the sending unit opening, the original fuel level sensor assembly electrically connected to a sensor terminal extending through the cap the method comprising the steps of:
a) removing the original fuel sending unit from the sending unit opening in the fuel tank;
b) providing a replacement cap for securement in covering relationship with the sending unit opening of the fuel tank, the replacement cap including a supply line conduit and a return line conduit extending therethrough and first, second and third terminals extending therethrough;
c) forming an access hole in the top wall of the fuel tank;
d) connecting the fuel pump to a cover plate sized to cover the access opening;
e) positioning the cover plate and fuel pump outside of the fuel tank and proximate the access hole therein;
f) connecting a first end of a fuel supply line to an outlet of the fuel pump;
g) threading a second end of the fuel supply line through the access hole, into the tank and out the sending unit opening;
h) connecting the second end of the fuel supply line to an in-tank end of the supply line conduit on the replacement cap;
i) inserting a fuel return line into the fuel tank through the access hole, positioning a first end of the fuel return line in the fuel tank in close proximity to a position in the fuel tank at which the fuel pump is to be mounted; and threading a second end of the fuel return line out the sending unit opening;
j) connecting the second end of the fuel return line to an in-tank end of the return line conduit on the replacement cap;
k) connecting a power supply conductor between the fuel pump and the first terminal extending through the replacement cap;
l) connecting a ground conductor between the fuel pump and the second terminal extending through the replacement cap;
m) connecting a fuel level sensor assembly to a cover plate mounting member;
n) inserting the cover plate mounting member and the fuel level sensor assembly into the fuel tank through the access hole;
o) connecting a fuel level sensor signal conductor between the fuel level sensor and the third terminal extending through the replacement cap;
p) inserting the in-tank fuel pump into the tank through the access hole and securing the cover plate to the cover plate mounting member in the tank with the cover plate extending in covering relationship across the access hole; and
q) securing the cap to the fuel tank in covering relationship across the sending unit opening.

8. The method as in claim 7 wherein the step of providing a cover plate mounting member comprises providing a mounting ring sized for insertion into the tank through the access hole and positioning the mounting ring against the tank around the access hole and bolting the cover plate to the mounting ring to secure the cover plate to the tank and wherein the step of connecting the fuel level sensor assembly to the cover plate mounting member comprises mounting the fuel level sensor assembly on a bracket connected to the mounting ring and the fuel level sensor assembly and bracket are inserted into the fuel tank upon insertion of the mounting ring therein.

9. The method as in claim 7 wherein prior to inserting the fuel pump into the fuel tank the method further comprises the step of inserting into or forming in the fuel tank a baffle positioned to surround an intake to the fuel pump when inserted into the fuel tank.

10. The method as in claim 9 wherein at least one check valve is positioned in an opening through the baffle to allow fuel to flow therethrough into but not out of the baffle.

11. The method as in claim 10 further comprising connecting a siphoning adapter to receive a stream of pressurized fuel from the fuel pump to create suction in a siphoning tube connected at a first end to the siphoning adapter and the method further comprises connecting a second end of the siphon tube in the tank remote from the baffle such that pumping of fuel through the siphoning adapter draws fuel from the tank through the siphon tube and the siphoning adaptor and discharges the siphoned fuel inside of the baffle.

12. A fuel tank adaptor assembly for use in mounting a fuel-pump in a fuel tank having a sending unit opening sized to receive an original fuel sending unit, the fuel tank adaptor assembly comprising:
a fuel pump including a fuel outlet, the fuel pump suspended from a cover plate;
a replacement cap for securement in the sending unit opening of the fuel tank, the replacement cap including a cap body having a supply line conduit and a return line conduit extending therethrough and first second, and third terminals extending therethrough;

a mounting ring sized for insertion into the fuel tank through an access hole formed therein with the mounting ring positionable against the tank around the access hole for bolting the cover plate to the mounting ring to secure the cover plate to the tank with the fuel pump suspended in the tank from the cover plate;

a fuel level sensor and a mount for mounting the fuel level sensor to the mounting ring in the fuel tank, the fuel level sensor having a fuel level signal conductor connected to and extending from the fuel level sensor and having a connector for operably connecting the fuel level signal conductor to the first terminal;

a power supply conductor connected to the power supply terminal of the fuel pump and having a connector for operably connecting the power supply conductor to the second terminal;

a pump ground conductor connected to the fuel pump and the pump ground conductor includes a connector for operably connecting the pump ground conductor to the third electrical terminal in the replacement cap;

a flexible, fuel supply line connected at an intake end to the fuel outlet of the fuel pump and having a discharge end operably connectable to the supply line conduit of the replacement cap; and a flexible, fuel return line operably connectable at an inlet end to the return line conduit of the replacement cap and a return line connector for securing a discharge end of the flexible fuel return line within the fuel tank.

13. The fuel tank adaptor assembly as in claim 12 further comprising a baffle positioned to surround an intake to the fuel pump suspended in the fuel tank from the cover plate.

14. The fuel tank adaptor assembly as in claim 13 wherein at least one check valve is positioned in an opening through the baffle to allow fuel to flow therethrough into but not out of the baffle.

15. The fuel tank adaptor assembly as in claim 13 further comprising a siphoning adapter connected to receive a stream of pressurized fuel from the fuel pump and having a discharge positioned to discharge fuel into the baffle, the assembly further comprising a siphon tube having a first end connected to the siphoning adapter and a second end positionable in the tank remote from the baffle wherein the stream of pressurized fuel from the fuel pump flowing through the siphoning adapter creates suction in the siphoning tube and draws fuel from the tank through the siphon tube and the siphoning adaptor and discharges the siphoned fuel inside of the baffle.

16. The fuel tank adaptor assembly as in claim 13 further comprising a venturi type siphoning adaptor having a pressurized fuel inlet connected in-line with a branch from the fuel supply line, a discharge positioned to discharge fuel into the baffle and a siphon inlet, a siphon tube is connected at a first end to the siphon inlet of the siphoning adaptor and a second end of the siphon tube is adapted to be mounted in the fuel tank outside of the baffle.

* * * * *